US006233855B1

(12) United States Patent
Alvern et al.

(10) Patent No.: US 6,233,855 B1
(45) **Date of Patent: *May 22, 2001**

(54) DISPLAY APPARATUS

(75) Inventors: Stein Alvern, Houston, TX (US); Øyvind Alvern, Hjellestad (NO)

(73) Assignee: Alvern ASA, Oslo (NO)

(*) Notice: Subject to any disclaimer, the term of this patent is extended or adjusted under 35 U.S.C. 154(b) by 0 days.

This patent is subject to a terminal disclaimer.

(21) Appl. No.: 08/723,134

(22) Filed: Sep. 30, 1996

Related U.S. Application Data

(63) Continuation-in-part of application No. 08/699,710, filed on Jul. 3, 1996, which is a continuation-in-part of application No. 08/610,961, filed on Mar. 5, 1996, which is a continuation-in-part of application No. 08/590,407, filed on Jan. 25, 1996.

(51) Int. Cl.[7] ........ G09C 3/10
(52) U.S. Cl. ........ 40/299.01; 222/23; 141/98
(58) Field of Search ........ 40/661, 299.01, 40/310; 141/98, 396, 391, 397; 222/23, 173, 192

(56) References Cited

U.S. PATENT DOCUMENTS

| | | | |
|---|---|---|---|
| D. 173,006 | 9/1954 | Anderson . | |
| D. 173,007 | 9/1954 | Anderson . | |
| D. 279,483 | 7/1985 | Goldman . | |
| D. 279,484 | 7/1985 | Goldman . | |
| D. 366,310 | 1/1996 | Fell . | |
| 2,177,406 * | 10/1939 | Hacker | 40/779 |
| 3,585,744 * | 6/1971 | Arnone | 40/633 |
| 4,408,791 | 10/1983 | Griffin et al. . | |
| 4,465,209 | 8/1984 | Wilder . | |
| 4,690,182 | 9/1987 | Knaus . | |
| 5,058,637 | 10/1991 | Fell . | |
| 5,184,309 | 2/1993 | Simpson et al. . | |
| 5,184,655 | 2/1993 | Fell . | |

FOREIGN PATENT DOCUMENTS

| | | |
|---|---|---|
| 122642 | 2/1995 | (AU) . |
| 123343 | 5/1995 | (AU) . |
| 0407271A1 | 1/1991 | (EP) . |
| 1393062 | 5/1975 | (GB) . |
| 2147273A | 5/1985 | (GB) . |
| 62-208396 | 9/1987 | (JP) . |
| 850627 | 10/1992 | (JP) . |
| WO90/08375 | 7/1990 | (WO) . |

* cited by examiner

*Primary Examiner*—Cassandra H. Davis
(74) *Attorney, Agent, or Firm*—Finnegan Henderson Farabow Garrett & Dunner, L.L.P.

(57) ABSTRACT

Display apparatus is removably attachable to the filler gun of a fuel pump, the filler gun including in series connection a gun nozzle having a forward discharge end and a rear end, a gun head having both a forward end portion which connects with the rear end of the gun nozzle and a rearward handle portion whose forward end connects to the rear of the gun nozzle and a rearward handle portion whose forward end connects to the rear end of the gun head. The display apparatus comprises a carrying body adapted to be fitted onto the filler gun and to extend from approximately a first junction between the rear end of the gun nozzle and the forward end of the gun head to approximately a second junction between the rear end of the gun head and the forward end of the handle, the carrying body having an upper surface defining an elongate display surface for messages, and comprising a first member and a second member and devices for releasably interconnecting the first and second members, the first and second members being shaped to generally conform, when so interconnected, to enclose the sides, bottom, and upper portions of the gun head, and device pivotally connected to the upper surface of the carrying body for supporting a replaceable message card placed on the display surface.

16 Claims, 37 Drawing Sheets

DISPLAY APPARATUS

CROSS-REFERENCE TO RELATED APPLICATION

This application is a continuation-in-part of copending U.S. application Ser. No. 08/699,710 filed Jul. 3, 1996 which is a continuation-in-part of copending U.S. application Ser. No. 08/610,961 filed Mar. 5, 1996, which is, in turn, a continuation-in-part of copending U.S. application Ser. No. 08/590,407 filed Jan. 25, 1996.

FIELD OF THE INVENTION

The present invention relates to a display apparatus removably attachable to the filler gun of a fuel pump. The filler gun includes, in series connection, a nozzle having a forward discharge end and a rear end, a gun head having both a forward end portion which connects with the rear end of the gun nozzle and a rearward handle portion whose forward end connects to the rear end of the gun head. The display apparatus comprises a carrying body adapted to be fitted onto the filler gun. The carrying body has an upper surface defining an elongate display surface for messages. The present invention display apparatus is also useful on the filler gun having the gun head covered by a protective boot of rubber or plastic material. Further, the present invention display apparatus is particularly, although not exclusively, useful for a carrying body extending from approximately a first junction between the rear end of the gun nozzle and the forward end of the gun head to approximately a second junction between the rear end of the gun head and a forward end of the handle.

BACKGROUND OF THE INVENTION

The prior art discloses a carrying body of the above mentioned type with the carrying body being shaped like a boot and having a rear end which is fully open for entry through the filler gun nozzle and the gun head, and a front end with a substantially smaller opening through which the filler gun nozzle extends when the carrying body is fitted onto the filler gun. A carrying body of such prior art type has an upper surface which effectively covers the upper region of the gun head in order to define the elongate display surface for messages. Such carrying bodies are suitable for use in countries having only a very limited number of filler gun types, such as, for example, in Norway, Denmark, Germany and Sweden. However, in other areas of the world, the number of differently designed filler guns may be substantially higher. In the United States of America, for example, the number of differently shaped filler guns is in excess of ten. Such a large number of different types of filler guns requires a large number of differently formed carrying bodies. In practice, it is difficult to obtain the same display surface area and configuration for each carrying body type. Also, some filler guns are so designed that it is difficult to design an easily fitted and removable carrying body.

It is highly desirable to have a carrying body which is easily attachable to the filler gun even by an inexperienced person, and also to have a carrying body which is easily removable from the filler gun when maintenance is to be carried out on the filler gun, e.g. repair of fuel valve means within the filler gun head.

Most filler guns are known to have the gun head covered by a protective boot of rubber or plastic material, both for protecting the gun head against damage and to prevent a bare gun head from making scratches on a car's paint work.

Removing such protective boot from a filler gun in order to mount a carrying body according to the present invention is both time consuming, resulting in a waste of such boot material, and causes the gun head to be less protected. The present invention therefore also includes the feature of being able to be fitted onto a filler gun without having to remove such protective boot.

According to a first embodiment of the present invention, the carrying body comprises a first member and a second member and means for releasably interconnecting the first and second members, the first and second members being shaped to generally conform, when so interconnected, to enclose the side, bottom, and upper portions of the gun head, and means removably connected to a top surface of the carrying body for supporting a replaceable message card placed on the display surface of the first member.

According to another embodiment of the present display apparatus, the carrying body comprises a lower member and an upper member releasably engagable with the lower member, the lower member having two side panels and means for interconnecting the side panels. The lower member, when the two side panels are brought to lie against the gun head, substantially fitting around a lower part of the gun head. The side panels have at their top region a first interlocking means, the upper member being formed as a cap-like member to fit over an upper part of the gun head and having a second interlocking means for releasably engaging the first interlocking means on the lower member, and a top member releasably engagable with the upper member. The top member has means for releasable engagement with the upper member, space being provided between an upper surface of the upper member and a portion of the top member for locating a replaceable message card when the top member and the upper member engage.

When the filler gun head is of the type already covered by a protective boot of rubber of plastic material, the carrying body can be fitted on the filler gun without having to remove the protective boot.

In a further embodiment of the display apparatus, the carrying body comprises a lower member and an upper member releasably engagable with the lower member, and further a top member which is releasably engagable with the upper member. The top member has a curved configuration along its length.

According to a further embodiment of the display apparatus, the carrying body may comprise a lower member, an upper member releasably engagable with the lower member, the lower member having two side panels and means for interconnecting the side panels. The lower member, when the two side panels are brought to lie against the gun head, substantially surround a lower part of the gun head. The side panels have at their top regions a first interlocking means, the upper member is formed as a cap-like means to fit over an upper part of the gun head, and having a second interlocking means for releasable engaging the first interlocking means onto the lower member. The upper member may have an upper (top) surface for locating a replaceable message card, the upper surface having along at least a portion of its peripheral edge an upwardly extending rim, and means protruding upwardly from the upper (top) surface for releasably engaging holes in the message card. This latter embodiment is also useful on a filler gun which has its gun head covered by a protective boot, because there is no need to remove the protective boot before fitting the carrying body to the filler gun.

According to the invention, it is also possible to provide a carrying body comprising a lower member, and an upper member releasably engagable with the lower member, the upper member having a top surface with a curved configuration along its length.

Although, in a preferred embodiment of the present invention the two side panels are brought towards each other to lie against opposite sides of the gun head, it is possible, with a choice of suitable material for the lower member, to have the two side panels integrally joined at a front region thereof. Such a variant may be useful in order to provide typical male/female elements for matching and joining front region edges of the two side panels.

In another preferred embodiment of the present invention, the two side panels are suitably formed as two separate panels which are provided with interconnecting means, such as snap-lock means.

Contrary to the prior art carrying body, the carrying body of the present invention is made of a substantially hard plastic material e.g. polyamide. The pivotally connected member or top member is also suitably made of a substantially hard plastic material, e.g. polycarbonate.

If the carrying body is provided with a pivotally connected top member, such member may have a lid with a transparent face portion for viewing a message therethrough, or a frame with an open space between opposite sides of the frame. In the case of a frame, the frame can be made of a transparent or non-transparent material, for example, polycarbonate, and the color thereof can, for example, be the same color as that of the carrying body, or a color which contrasts with the color of the carrying body. Also, such frame could have a portion carrying information related to the type of fuel supplied from the gun. Further, in order to more easily detach the frame from the upper member, the upper member may at a peripheral region adjacent to a corresponding portion of the frame have a transverse dimension which is less than the transverse dimension of the frame.

The existence in a given market area of a significant number of differently sized and shaped filler guns creates the problem of being able to affix to all, or substantially all of such filler guns, message cards having a uniform size and shape. The present invention obviates this problem.

This is accomplished by affixing to such filler guns shell-like members which are so sized and configured as to reasonably closely conform to the corresponding outer side and bottom surfaces of the filler gun. The shell-like members support thereon a top lid or the like which may be integrally formed with, or separately fabricated and attached to, said members which surround said side and bottom surfaces. The outer configuration of such top lid is formed in size and outer contour so as to attach to the above-mentioned shell-like members. The top surface is further provided with a message card receiving cavity or the like which is so sized and configured as to removably support all message cards of standard size and configuration.

These, and further, embodiments of the display apparatus according to the present invention will appear from the description below with reference to the attached drawing figures, as well as the attached patent claims.

The present invention is now to be described with reference to the attached drawing figures illustrating preferred, but non-limitative embodiments, of the present invention.

DETAILED DESCRIPTION OF THE PREFERRED EMBODIMENT

Figure 1:
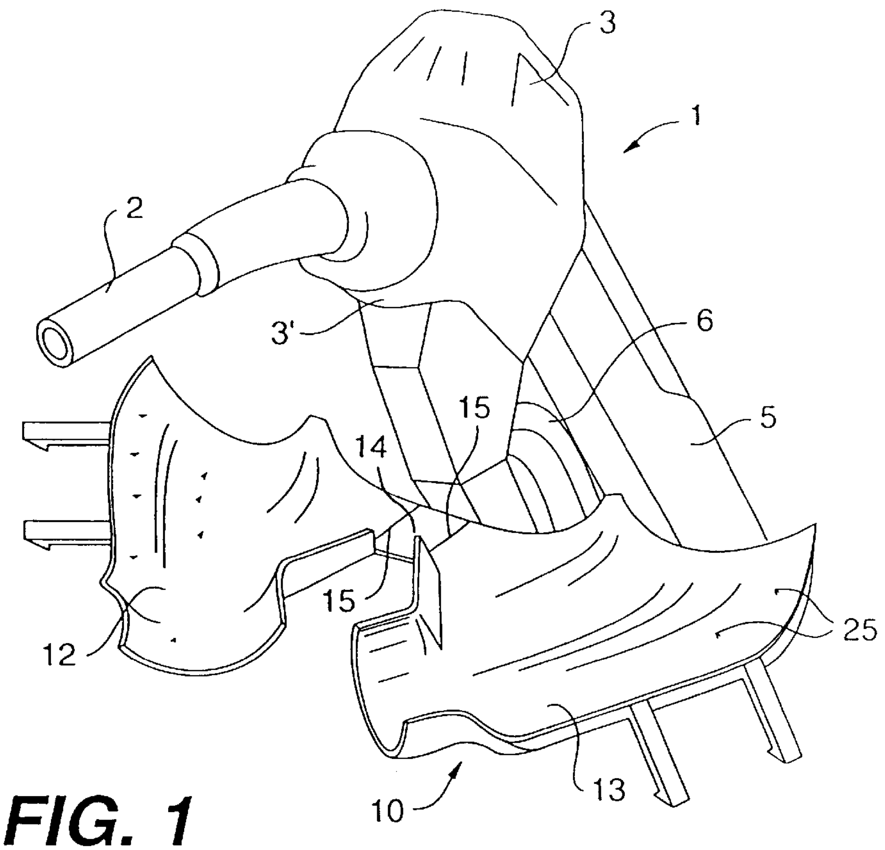
FIGS. 1 and 2 illustrate the fitting of a lower member of the carrying body of the present invention onto a filler gun head.
Figure 2:
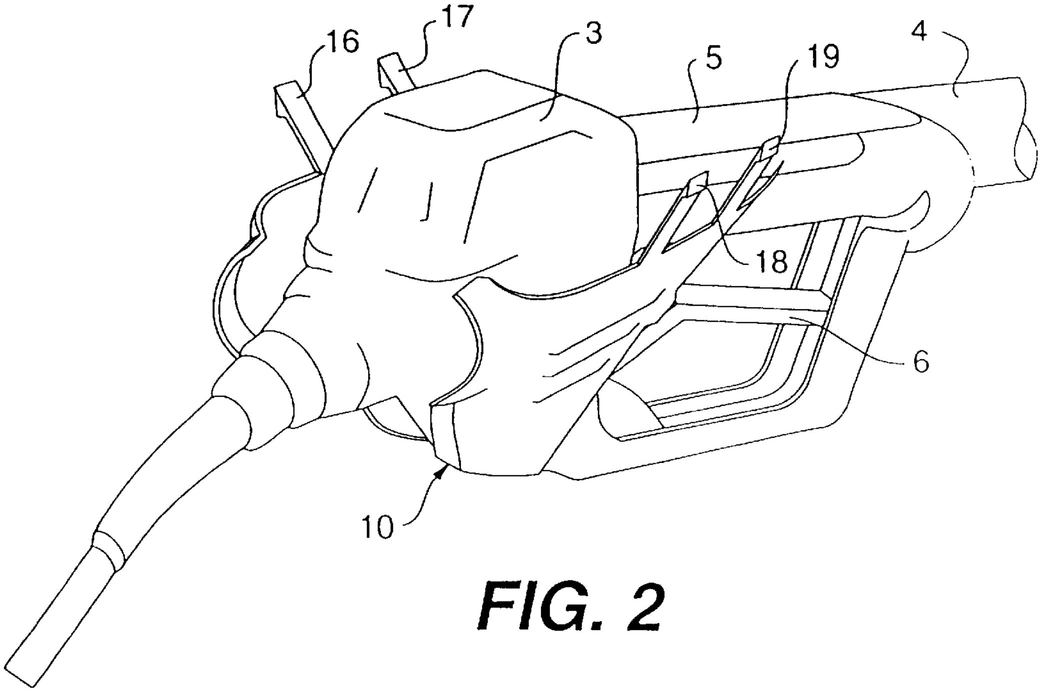

FIGS. 1 and 2 show a filler gun 1 of a fuel pump. The filler gun includes a fuel gun nozzle 2 for discharging fuel at its front end and a gun head 3 having internally located fuel valve means (not shown). The valve outlet means communicates with the nozzle 2 and valve inlet means (not shown) communicates with fuel supply means connected to a fuel hose 4, the fuel supply means extending through a handle 5 of the gun. The handle 5 has lever means 6 which are operatively connected to the valve means. The gun head 3 may be of an unprotected type, or may be covered by a protective boot of rubber or plastic material as indicated by reference number 3'.

Figure 4:
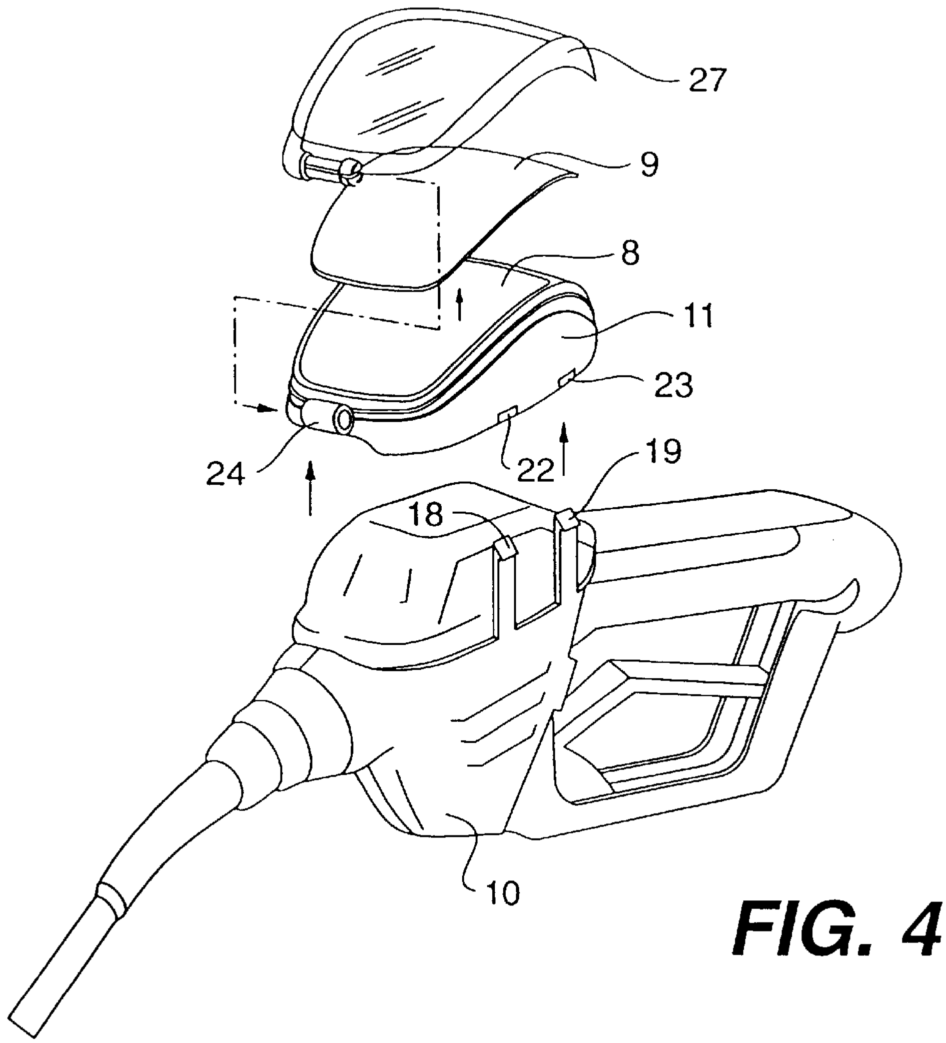
FIG. 4 further illustrates the mounting of the upper member onto the filler gun with pivotable engagement of a top member with the upper member.
Figure 5:
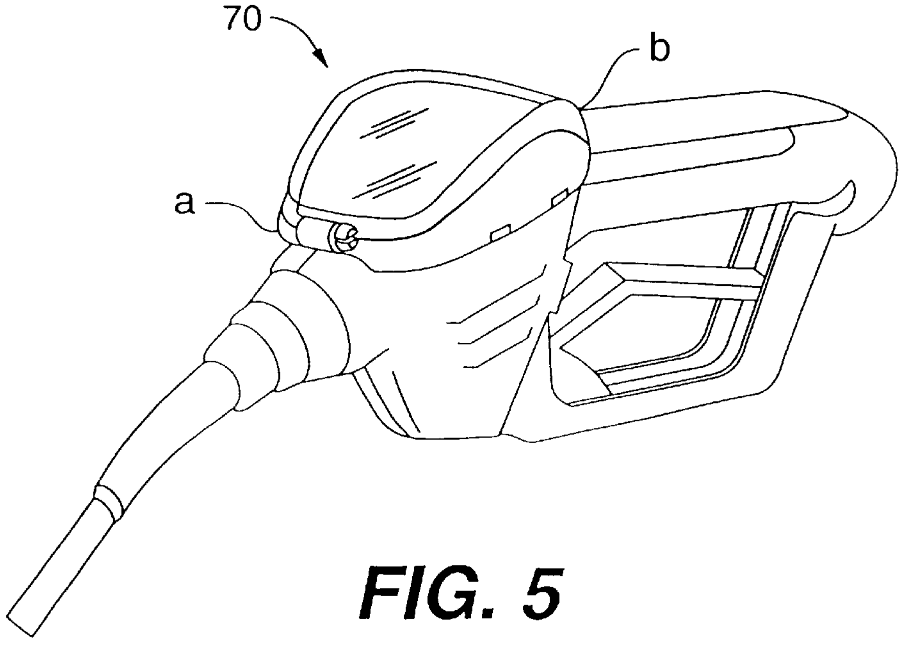
FIG. 5 shows a carrying body with a top member fully installed on the filler gun.

As shown in FIGS. 4 and 5, the filler gun is provided with a display apparatus, generally denoted by reference number 70. Such display apparatus is intended for supporting on its upper surface 8 a message card 9 for displaying a graphic message readily viewable by a filler gun user.

As clearly shown in FIGS. 4 and 5, the carrying body 7 for the graphic message is adapted to fit over the filler gun so as to extend from approximately the junction "a" of the gun nozzle 2 with the gun head 3 to approximately the junction "b" of the gun head 3 with a forward end of the handle 5. The display surface 8 for the graphic message, when the carrying body 7 is attached to the filler gun, also extends longitudinally along the filler gun from approximately the junction "a" of the gun head 3 with the nozzle 2 to approximately the junction "b" of the gun head with a forward end of the handle of the gun.

As clearly seen from FIGS. 1–5, the carrying body 7 comprises a lower member 10 and an upper member 11 releasably engagable with the lower member 10. The lower member 10 has two side panels 12, 13, a bottom element 14, and means 15 such as film hinges or other transition means integrally connecting side panels 12, 13 with the bottom element 14. As shown in FIG. 2, the lower member 10 with its side panels 12, 13 and bottom element 14 may be brought to lie against the gun head 3, substantially fitting around a lower part of the gun head. At the top region of the side panels are first interlocking means 16, 17 and 18, 19 on the respective panels 12 and 13. The first interlocking means 16–19 are suitably formed as male elements in the form of snap hooks.

Figure 3:
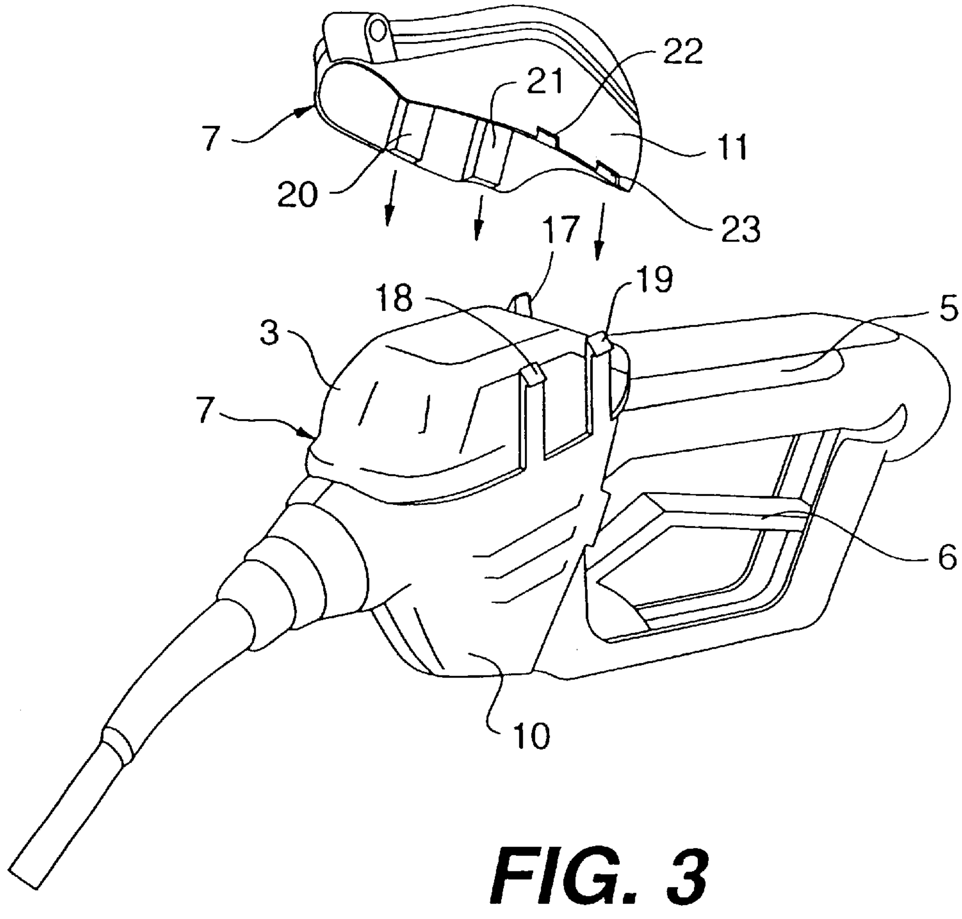
FIG. 3 illustrates the fitting of an upper member of the carrying body onto the filler gun head through engagement with the lower member.
Figure 10:
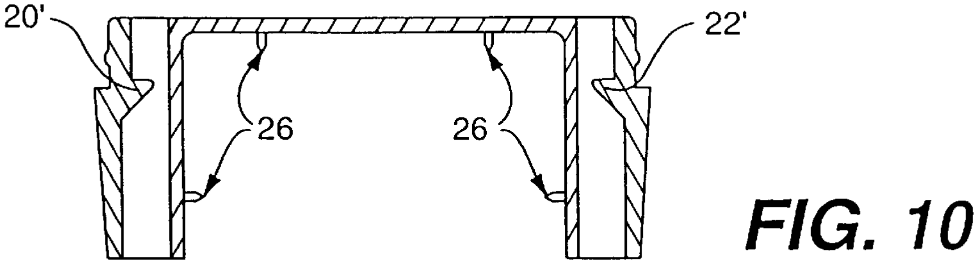
Figure 11:
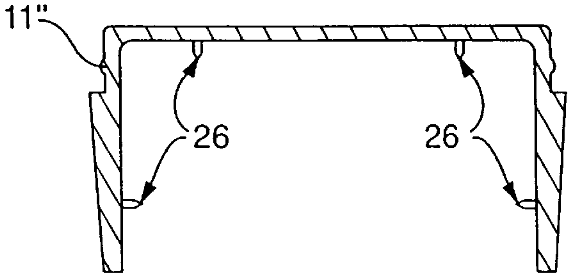

As seen from FIGS. 3 and 4, the upper member 11 is formed as cap-like means to fit over an upper part of the gun head 3. The upper member 11 has second interlocking means 20, 21 and 22, 23 for releasably engaging the first interlocking means 16, 17 and 18, 19, respectively, on the lower member. The second interlocking means are formed as female elements having means, e.g. in the form of a ledge or set-off 20', 21', 22', 23' as indicated more closely in FIGS. 7, 8 and 10. FIG. 1 shows that the panels 12, 13, the bottom element 14, the connecting means 15 and the first interlocking means 16–19 are formed as an integrally made structure, e.g. through an injection molding process.

Figure 14:
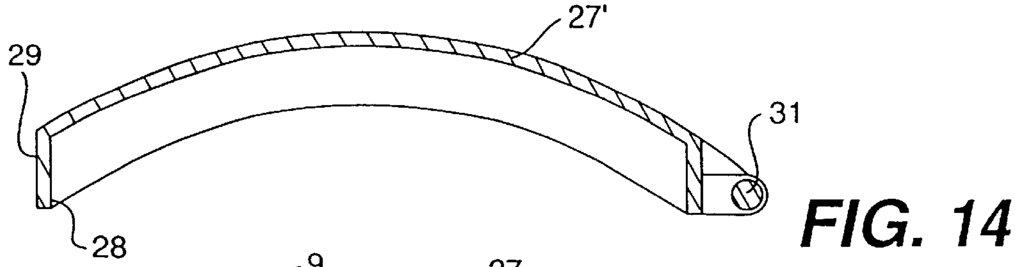
FIG. 14 is section XIV—XIV of FIG. 13.
Figure 15:
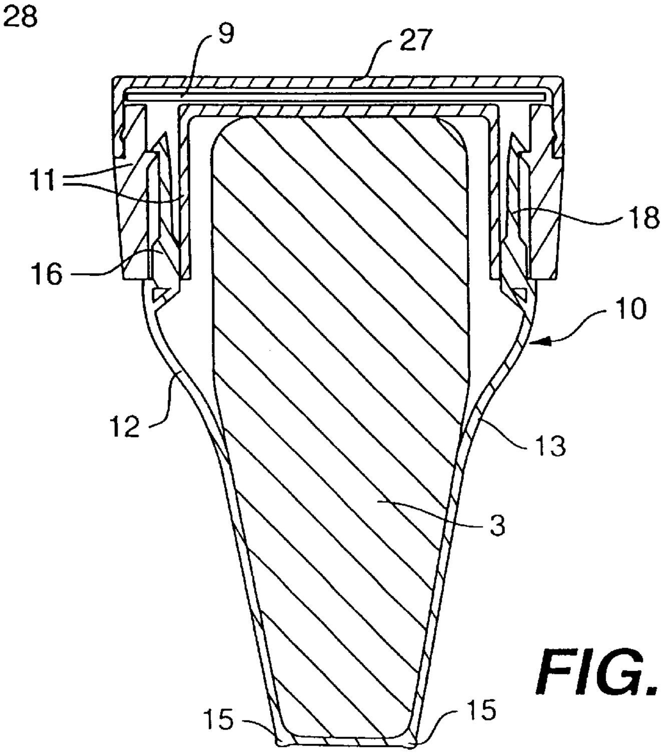
FIG. 15 is a cross-section through the display apparatus with the top member of FIG. 13 and installed on a filler gun.

As seen from FIG. 6, the upper member 11 has an upper peripheral portion 11' with a bead 11" extending along the upper peripheral portion 11' for releasably engaging a peripheral skirt portion of a top member located on the upper member 11, as will be explained further with reference to FIGS. 13–15.

At a forward end of the upper member, there is provided a first hinge means 24 in the form of a protruding member having a transverse hole 24'.

As illustrated in FIGS. 1 and 2, side panels 12, 13 may be provided with a plurality of integrally made studs 25 which compensate for tolerances in the space between the panels 12, 13 and the gun head 3 as well as being able to penetrate partly into any protective boot provided on the gun head. Thus, when fitted around the gun head 3, the lower member 10 may obtain improved contact with the gun head 3.

Similarly, as indicated in FIGS. 8–11, the upper member 11 may have similar, or technically equivalent, space-compensating studs, generally denoted by reference number 26. The studs preferably should be so dimensioned that they easily yield and/or penetrate into the soft protective boot for covering the gun head, if so provided.

Figure 12:
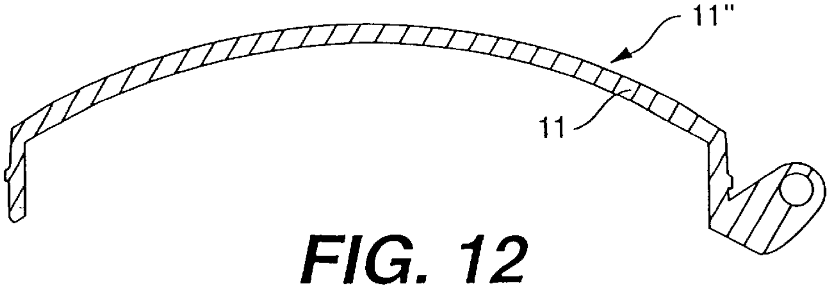

FIG. 12 discloses that the top face 11''' of the upper member 11 has a curved configuration along its length. In a first embodiment, the top member shown in FIG. 4 and also in FIG. 13, is labelled with reference number 27 and is formed as a lid with a transparent face portion 27' for viewing a message on the message card 9. The top member 27 has means in the form of thickened portions 28 on a peripheral skirt portion 29 depending from the transparent face portion 21' which are designed to engage bead 11' on upper member 11. Space is provided between an upper surface of the upper member 11 and a portion of the top member 27 in order that the replaceable message card 9 can be located in such space when the top member 27 and the upper member 11 engage, as illustrated in FIG. 15. FIG. 15 shows how the lower member 10 with its side panels 12, 13 and the first interlocking means 16, 18 are capable of snap locking to the upper member 11.

Top member 27 is suitably provided with a second hinge means 30 engagable with the first hinge means 24 on the upper member 11 for pivotable attachment of the top member 27 to the upper member 11. The second hinge means has a protrusion which is integral with a pin 31, suitably having a slit 32 and a thickened end 33.

Figure 16:
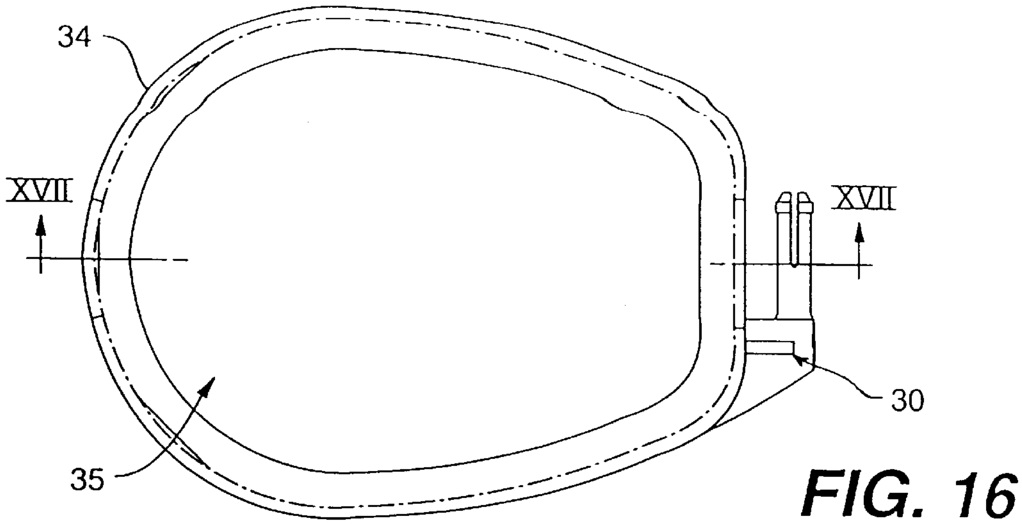
FIG. 16 is a top plan view of a modified top member of the display apparatus formed as an open frame.
Figure 17:
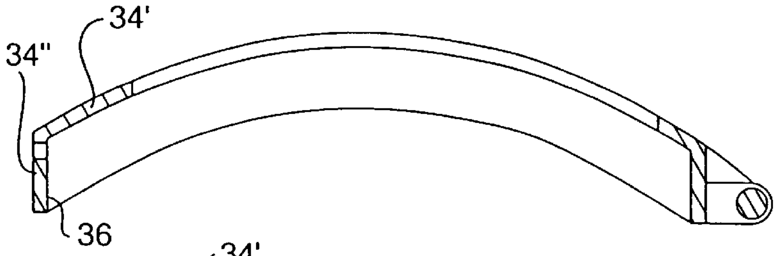
FIG. 17 is sectional view XVII—XVII of FIG. 16.
Figure 18:
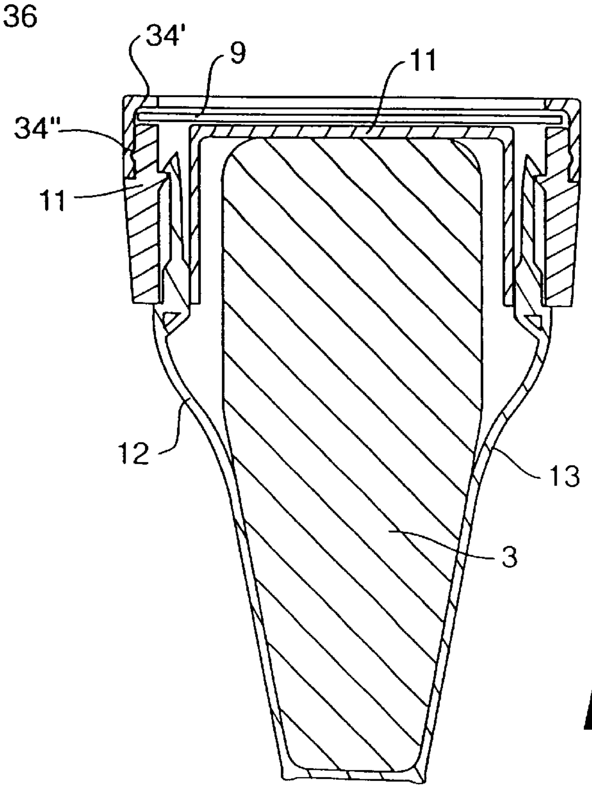
FIG. 18 is a cross-section of the display apparatus, according to the present invention fitted onto a filler gun and having a top member according to FIG. 16.

FIGS. 16–20 will now be explained with regard to the differences from what is shown and described in connection with FIGS. 13–15. Instead of the top member 27 being formed as a lid, the embodiment of FIG. 16 shows a top member 34 formed as a frame with open space 35 between opposite sides of the frame. The frame has a first element 34' which overlies a marginal edge portion of a top surface of the upper member 11 as clearly illustrated in FIG. 18 and a second element 34" integral with first element 34' for releasably engaging the upper peripheral portion of the upper member 11. As similarly shown in FIG. 13, the second element may be provided with second portions 36 to provide releasable engagement with the upper peripheral portion of the upper member. Similarly to what is shown in FIGS. 13 and 14, the top member according to FIG. 16 is provided with a second hinge means 30.

The top member of FIG. 16 can be made of a transparent material. Alternatively, it can be made of a non-transparent material, e.g. of a color that is the same as that of the upper member 11, or a color forming a suitable contrast with the color of member 11.

Figure 19:
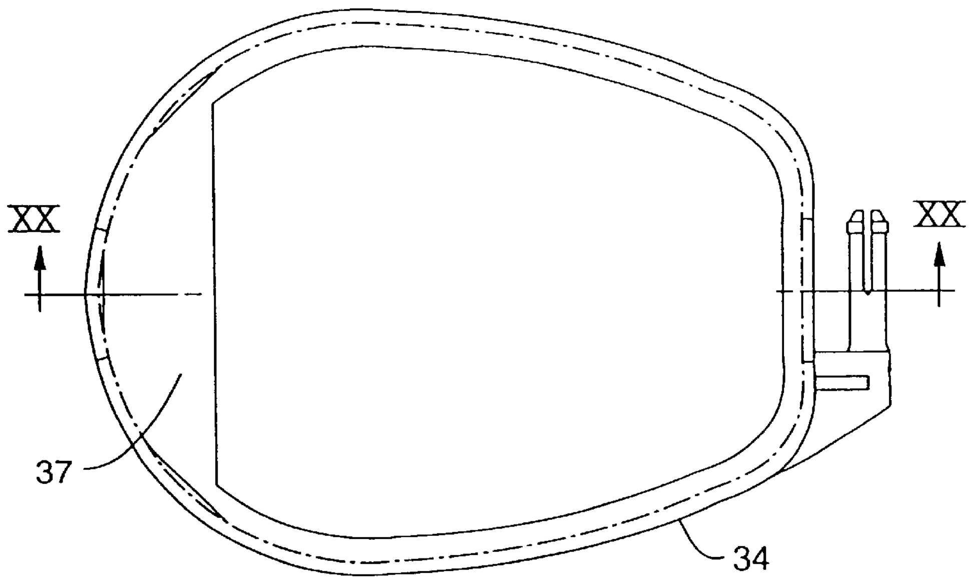
FIG. 19 shows a top plan view of a modification of the top member of FIG. 16.

FIG. 19 is a slight modification of the embodiment of FIG. 16 in that a rear end of the top member has a widened portion, as shown in the longitudinal direction of the top member. The widened portion of the frame is labelled with reference number 37 and is in reality a widened portion of the first element 34' shown and described in connection with FIGS. 16 and 17. The widened portion 37 of the frame is suitable for carrying information related to type of fuel supplied from the gun, e.g. "PREMIUM."

Figure 20:
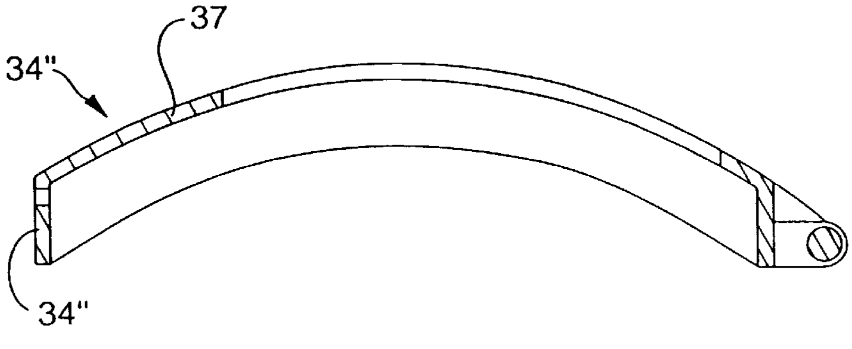
FIG. 20 is cross section XX—XX of FIG. 19.
Figure 21:
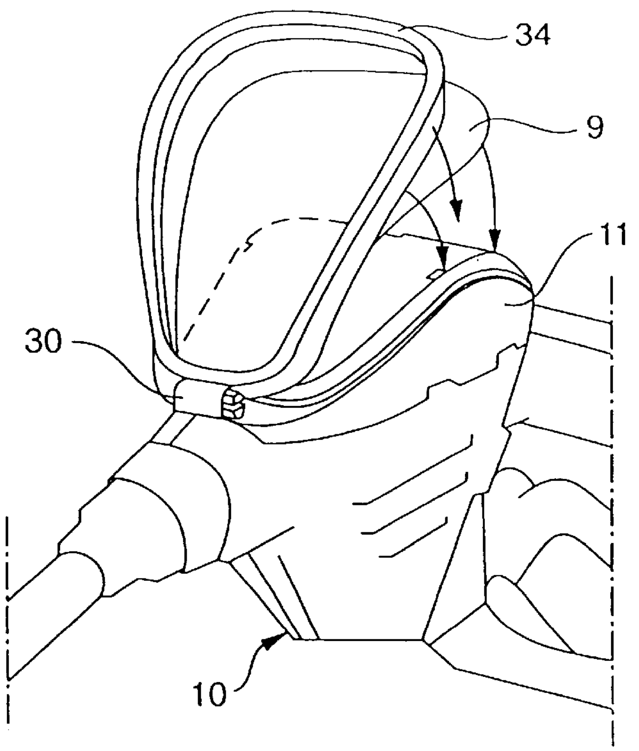
FIG. 21 illustrates in a perspective view the display apparatus installed on a fuel gun with a top member according to FIG. 16.
Figure 22:
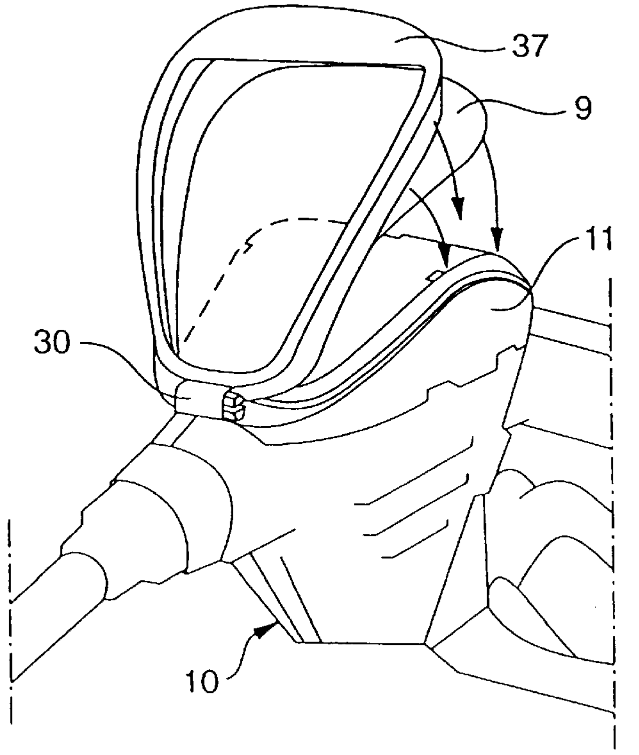
FIG. 22 shows in perspective view a display apparatus according to the present invention installed on a filler gun and with a top member according to FIG. 19.

FIG. 21 is a perspective view of the embodiment according to FIGS. 16–18, and FIG. 22 is a perspective view of the embodiment according to FIGS. 19 and 20.

Figure 67:
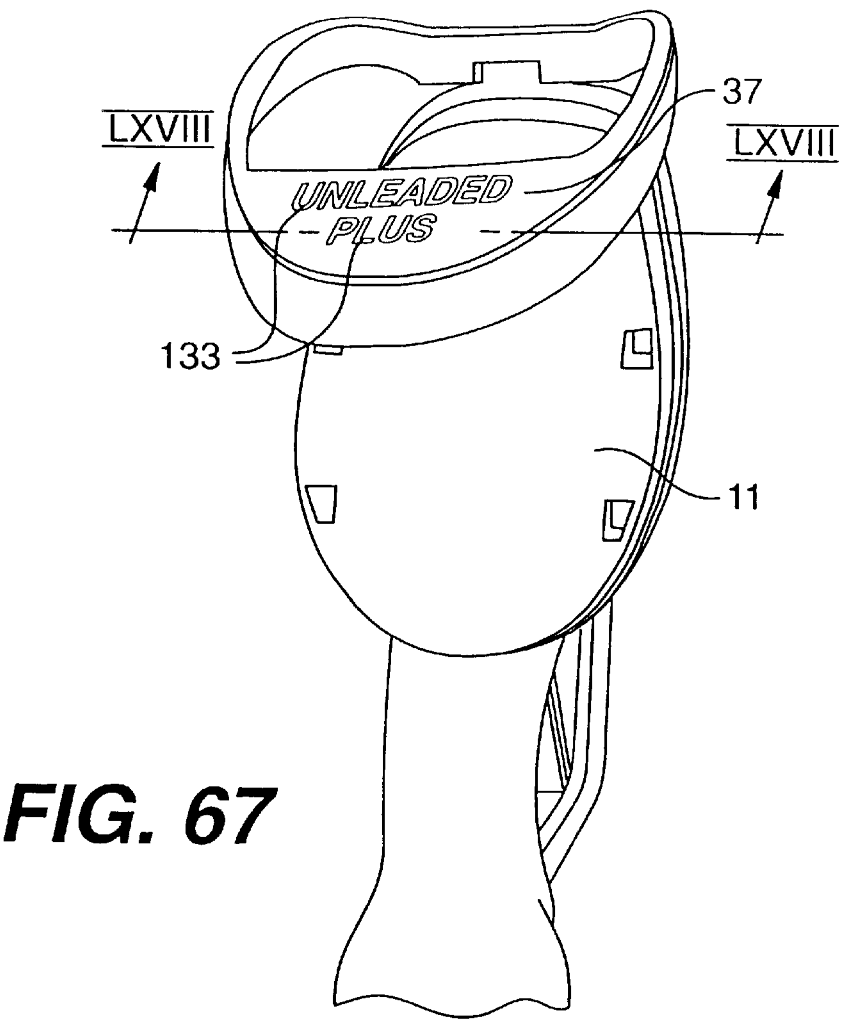
FIG. 67 illustrates a modification of the embodiment as shown in FIGS. 19, 20, and 22.
Figure 68:
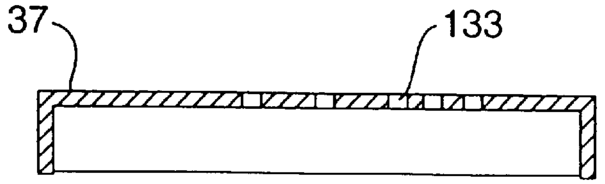
FIG. 68 is cross-section LXVIII—LXVIII of FIG. 67.

As indicated in FIGS. 19, 20, it is suitable to use the widened portion 37 on the top member for carrying information related to fuel type. Although such information could be applied to portion 37 by a printing process, or by using recesses filled with contrasting color compounds, one way of providing such information is by forming openings 133 as shown in FIG. 67 and in cross-section LXVIII—LXVIII of FIG. 67 as shown in FIG. 68, said openings extending through said portion 37 and corresponding to the textual information to be shown, such as, e.g. "UNLEADED PLUS". If the top member, formed as a frame, is of a color such as green or red, a white non-printed part of a message card to be located underneath portion 37 will be seen in the openings and form contrast with the colored material surrounding the openings, thus making the fuel type information easy to read. The openings are created during the molding process of the top member.

Figure 69:
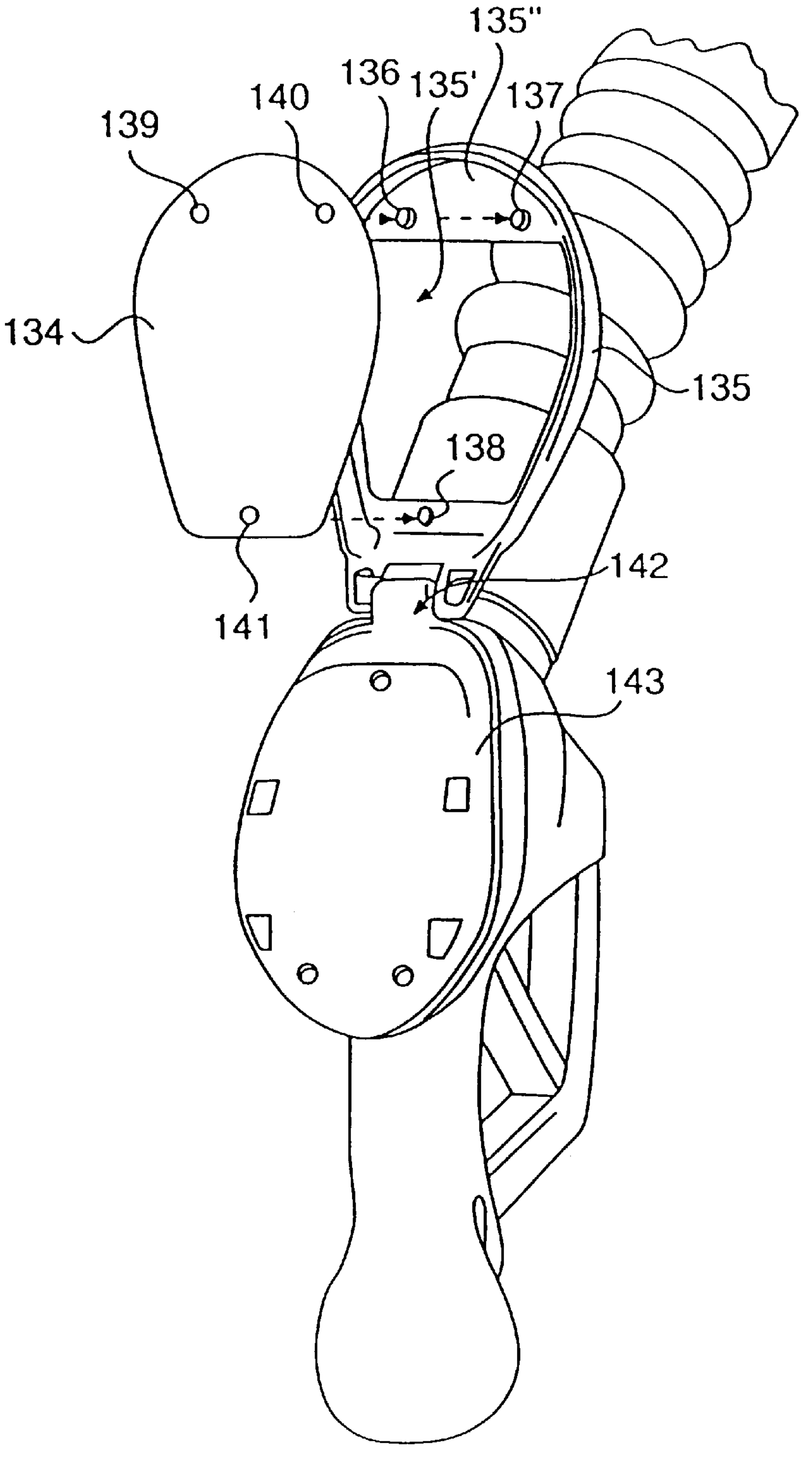
FIG. 69 illustrates an improvement of the top member shown in FIGS. 19, 20 and 22.

When using a top member as shown in FIGS. 19, 20, 67 and 69, use of a message card 134 may be avoided by forming a display opening 135' in top member 135 as shown in FIG. 69. For that purpose, the fuel type display area 135" on its rear face may be provided with engagement studs 136, 137, e.g. of arrowhead cross section, adapted to engage with corresponding holes 139, 140 in the card 134. At the rear of the front region of the top member 135, i.e. adjacent hinge means 142 connecting top member 135 and upper member 143, at least one further engagement stud 138 may be provided for engaging a corresponding hole 141 in the card 134. Thereby, card 134 is held in place on top member 135. Further, the top face of the upper member 143 may be provided with holes 144, 145, 146 for receiving studs 136, 137, 138.

Figure 6:
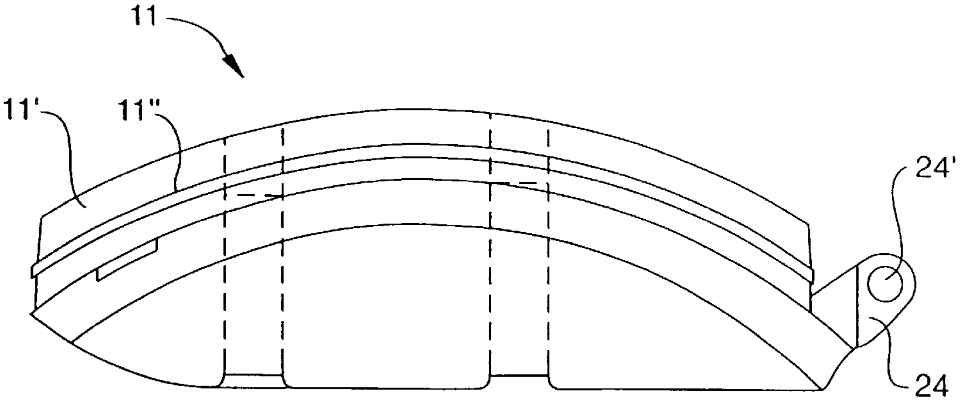
FIG. 6 is a side view of the upper member of the carrying body, according to the present invention.
Figure 7:
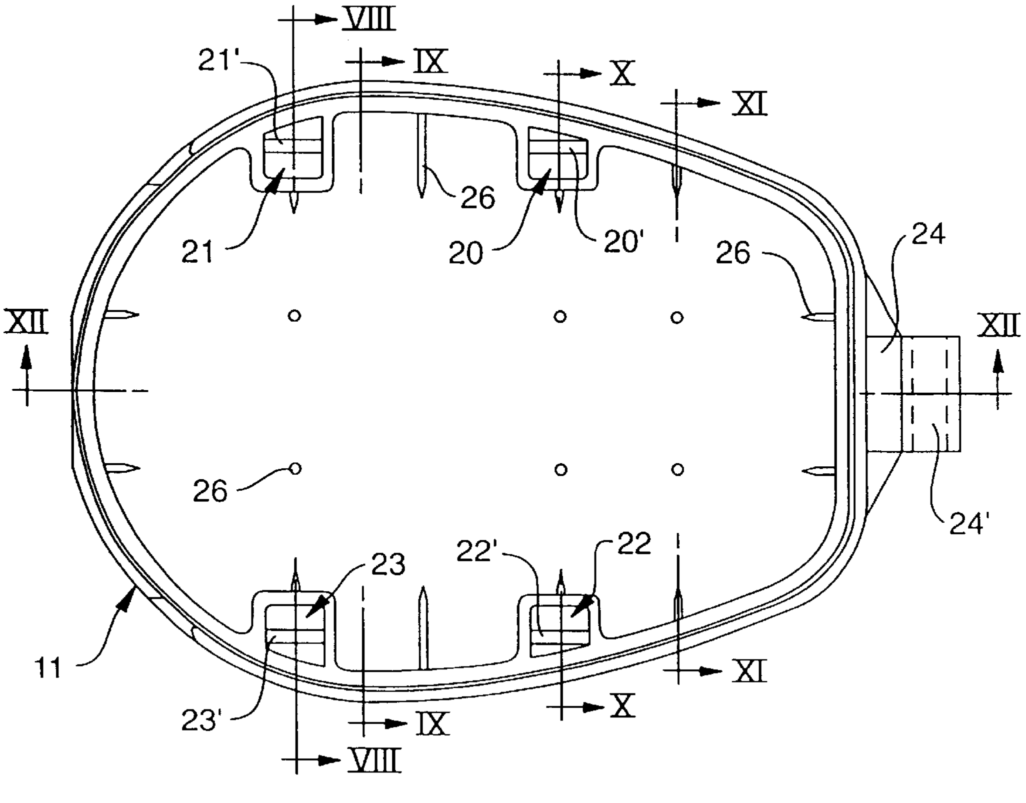
FIG. 7 is a bottom view of the upper member of the carrying body, according to the present invention.
Figure 8:
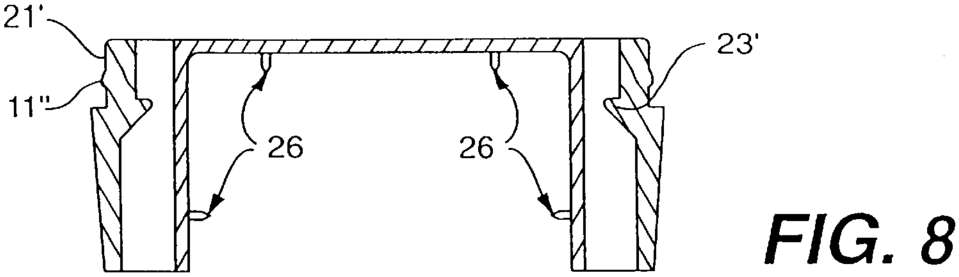
FIG. 8, 9, 10, 11 and 12 are sectional views VIII, IX, X, XI and XII of FIG. 7.
Figure 9:
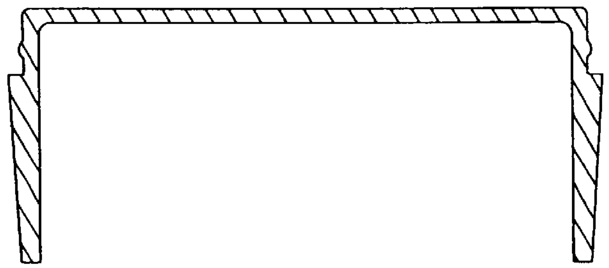
Figure 13:
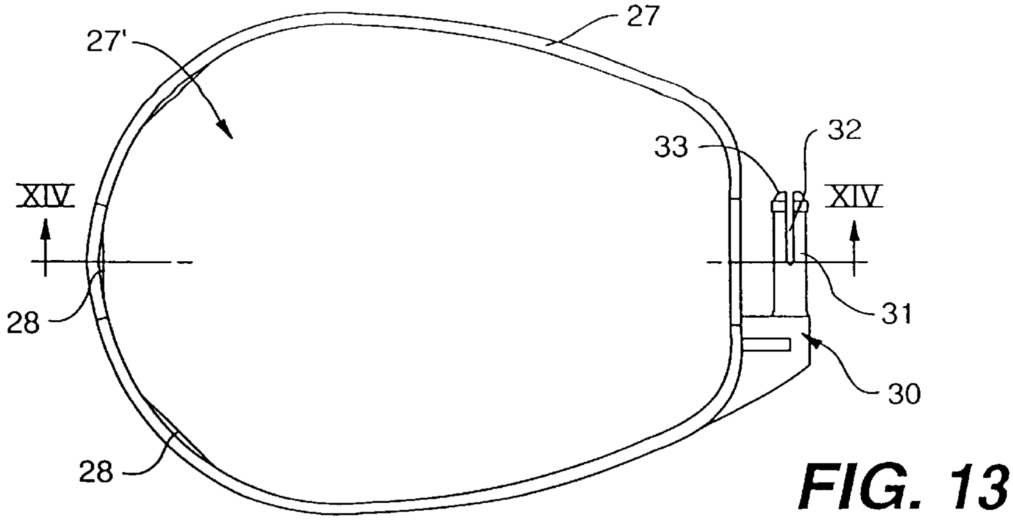
FIG. 13 is a top plan view of a top member of the display apparatus, according to the invention.

FIG. 13, when considered with reference to FIGS. 6 and 7, discloses the second hinge means as being in the form of a male member 31 which is capable of releasable snap engagement with female member 24 of the hinge connection between the upper member 11 and its top member, e.g. 27 as shown in FIG. 13, element 34 as shown in FIG. 16, or the modified version of the top member 34 as shown in FIG. 19.

Figure 23:
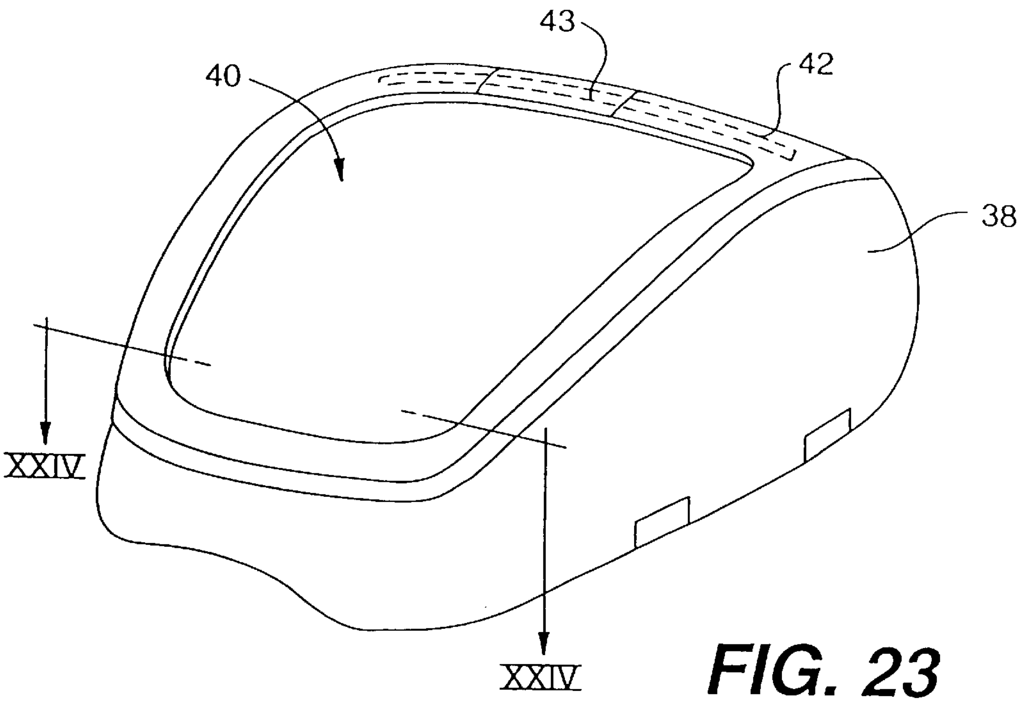
FIG. 23 shows a further embodiment of an upper member of the carrying body of the display apparatus according to the present invention, with an integral frame structure at the top surface of the upper member.
Figure 24:
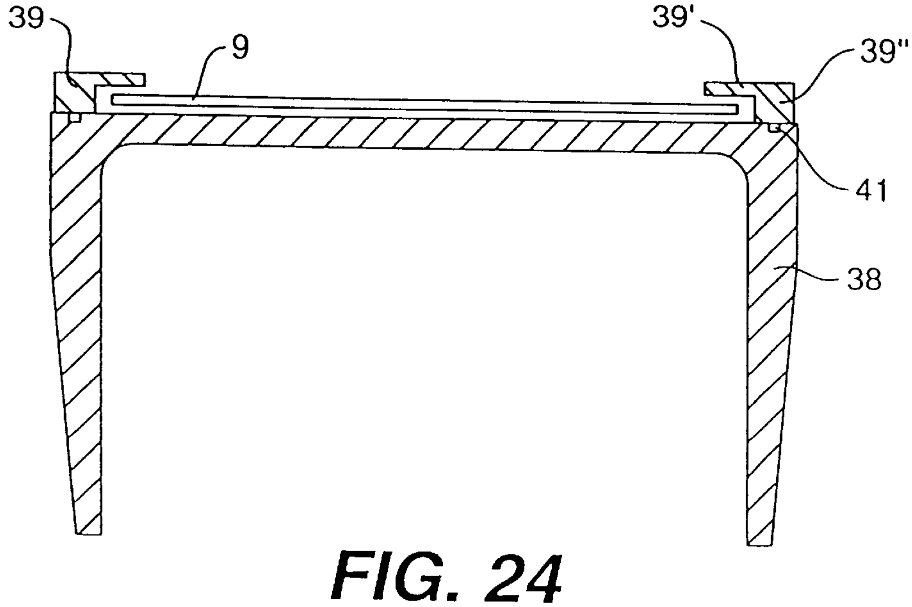
FIG. 24 is a cross-section XXIV—XXIV of FIG. 23.
Figure 25:
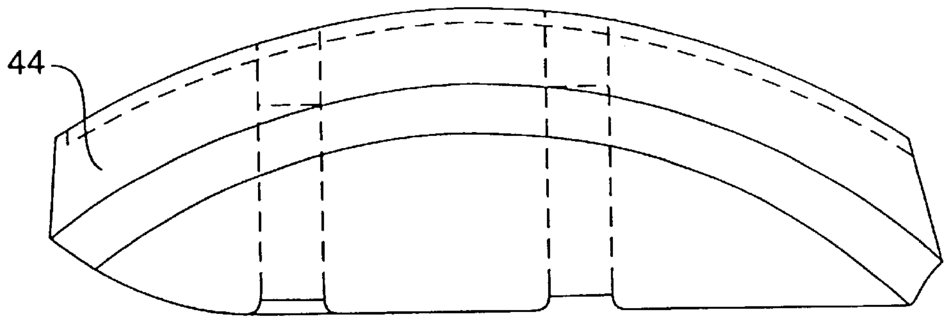
FIGS. 25, 26 and 27 are side, top and perspective views, respectively, of a further modified upper member of the carrying body.

A modified version of the upper member 11 is shown in FIGS. 23 and 24, the modified upper member being denoted by reference number 38. The upper member 38 has, along its peripheral outline, a frame member 39 formed with open space 40 between opposite sides of the frame 39. The frame has a first element 39' located over a marginal top edge portion of the upper surface of the upper member 38, and a second element 39" integral with the first element 39'. The second element is preferably integral with the upper surface of the upper member, e.g. by welding or through the use of suitable adhesive. To properly locate the frame 39 onto the upper member 38, e.g. during welding or other operation for joining the two male/female members, generally denoted by reference numeral 41 may be provided on the frame 39 and the upper member 38, respectively.

To provide insertion of a message card 9 in the space between the upper surface of the upper member 38 and the first element 39' of frame 39, a slot 42 as shown by dotted lines on FIG. 23 facilitates insertion into the second element 39" of the frame 39. Alternatively, the first element 39' of the frame 39 may have a section 43 removed to permit easy insertion and removal of message card 9.

An additional modification of the upper member 11 is shown and described with reference to FIGS. 25–29. In this embodiment, the upper member is labelled with reference numeral 44. It has a top surface 44' and, along at least a portion of the peripheral edge of the top surface, an upwardly extending rim 45. The rim is preferably only a few millimeters high, maybe even less. Means in the form of studs 46 protrude up from the surface 44', the protruding means 46 having a substantially arrow-shaped configuration, a straight upright portion thereof having a height substantially equal to the thickness "d" of the message card 9.

Figure 27:
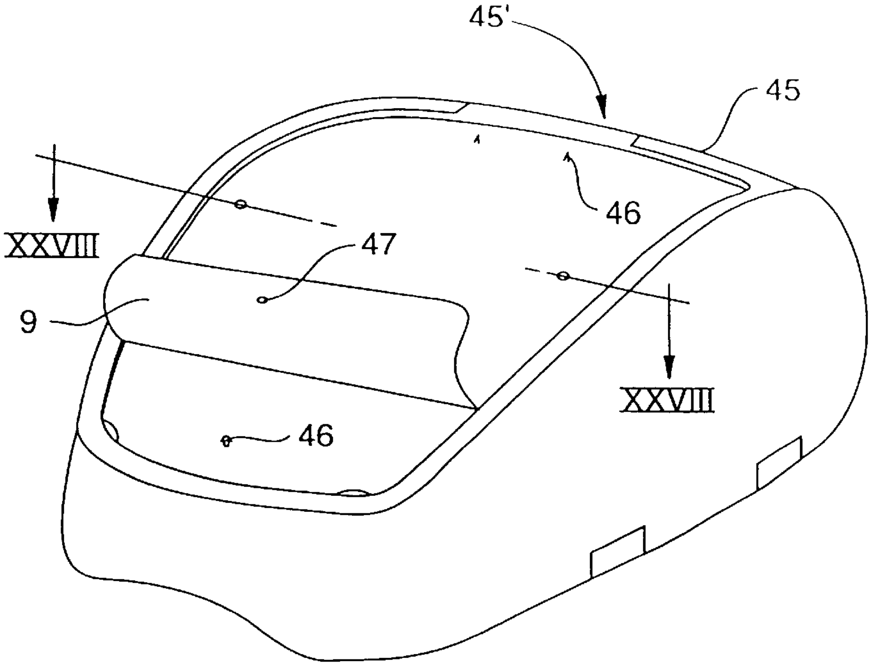
Figure 28:
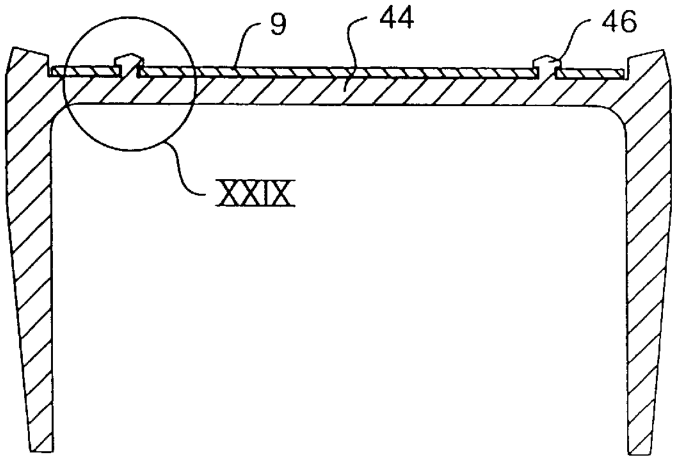
FIG. 28 is a cross-sectional view XXVII—XXVII of FIG. 27.
Figure 29:
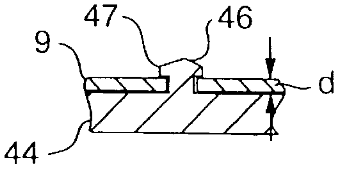
FIG. 29 is an enlarged view XXIX of FIG. 28.

When the message card 9 is positioned inside the inner circumference of the rim 45 as indicated on FIG. 27, holes 47 provided in the message card 9 are brought into snap-like engagement with the arrow-shaped studs 46. Thus, the message card 9 is held suitably in place on the upper member 44. To provide for drainage of any rain water when the gun is located on the fuel pump between filling operations, the rim 45 may be provided with an opening 45' as indicated in FIG. 27. The opening 45' also provides for easier removal of the message card 9 when it is to be replaced by a new message card.

Figure 26:
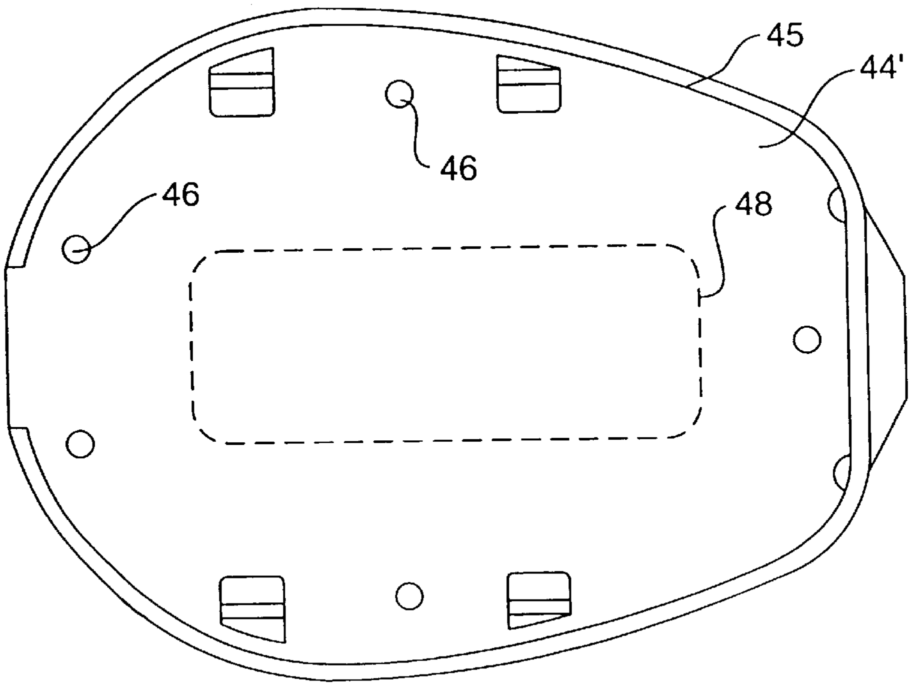

To further secure the message card 9 onto the top surface 44' of the upper member 44, a region of adhesive 48 may be applied to the upper surface 44' of the upper member 44 as indicated in FIG. 26. Alternatively, the adhesive may be available on the rear side of the message card 9 and be of a type which firmly adheres to the rear side of the message card 9 but not so firmly that it sticks to the upper surface 44' of the upper member 44.

Figure 30:
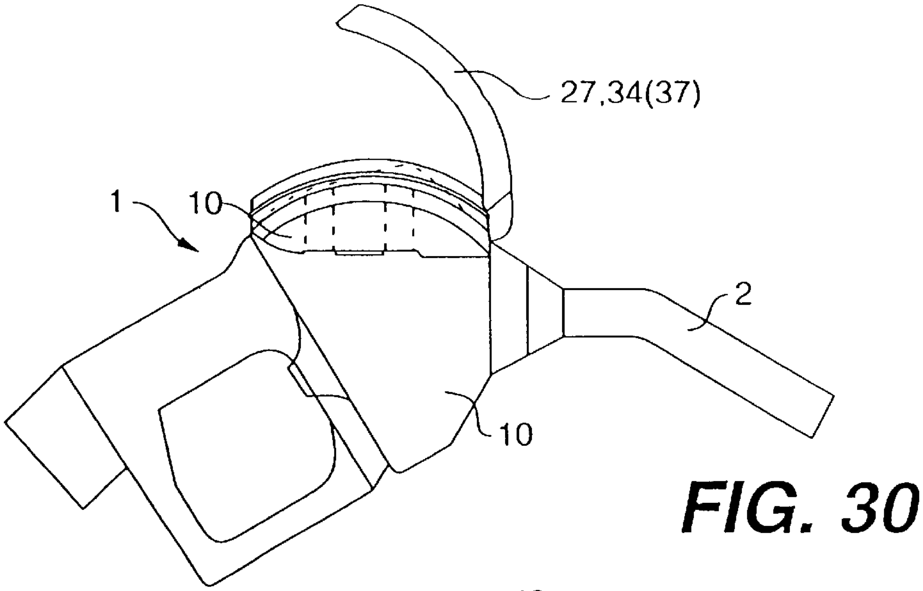
FIG. 30 is a side view of a filler gun with a two-part carrying body fitted thereon and with a pivotally connected top member fitted onto the carrying body.

FIG. 30 illustrates how the display apparatus according to the present invention, and in accordance with the embodiments shown and described in connection with FIGS. 1–22, appears in a side view when mounted on a filler gun.

Figure 31:
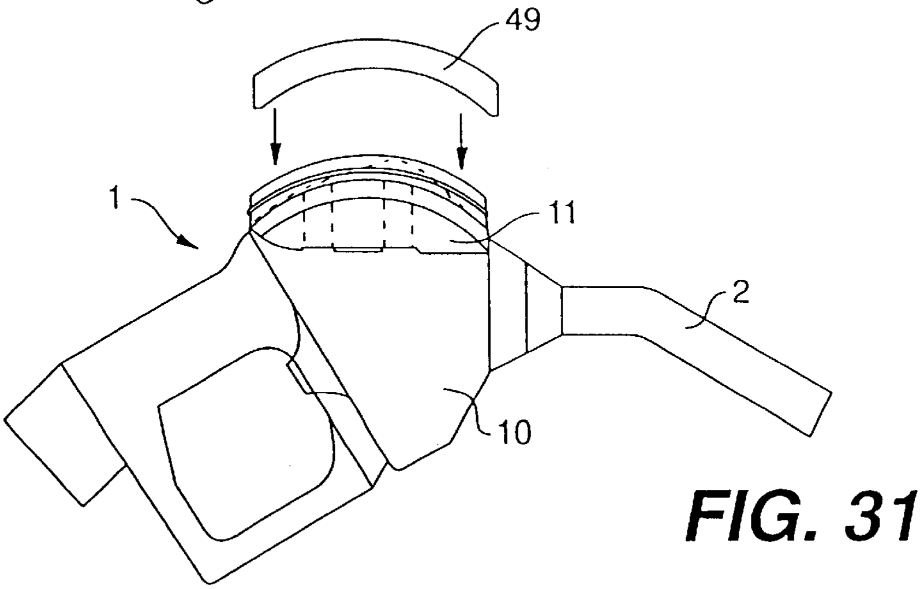
FIG. 31 is a side view of a filler gun with a two-part carrying body fitted thereon, and with a top member engagable with an upper part of the carrying body.

FIG. 31 illustrates the top member 27; 34 (and 37) could be replaced by a top member 49 having no pivotable connection with the upper member 11. In such a variant, the hinge means 24, 30 are not present.

Figure 32:
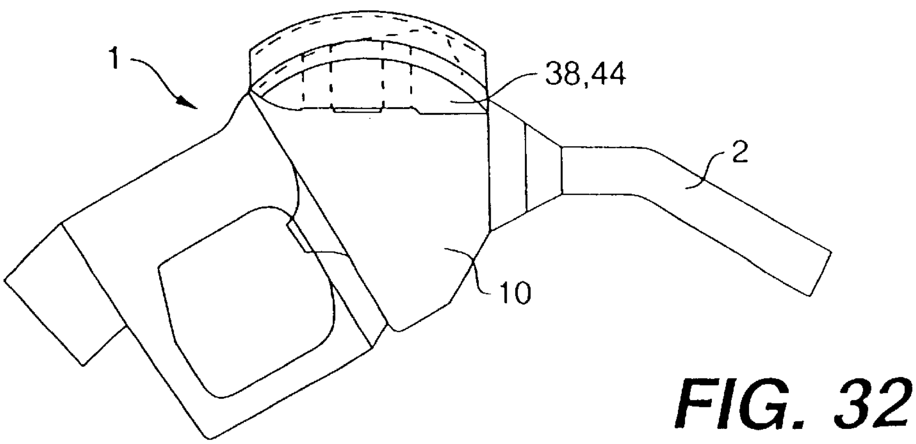
FIG. 32 is a side view of a filler gun with a two-part carrying body fitted thereon in accordance with the embodiments shown in FIGS. 23, 24 and 25–29.

FIG. 32 illustrates a side view of the embodiments according to FIGS. 23, 24 and 25–29.

In connection with the description of FIGS. 1 and 2, it should be noted that the side panels 12, 13 at the front region have edges which mate when the panels are brought to lie against the gun head. Until such moment, the edges are spaced apart. However, in a modified embodiment of the lower member 10, denoted by reference numeral 10*a* in FIGS. 33 and 35, it is proposed, to let the two side panels 12, 13 be integrally joined at a front region thereof. Suitably, the front region of the two side panels is above, as indicated by reference number 10', and below as indicated by reference number 10" a front opening 10'" in the lower member, through which the fuel gun nozzle 2 extends when the lower member 10*a* is brought into engagement with the gun head 3 on the filler gun 1, as illustrated on FIG. 33.

Figure 33:
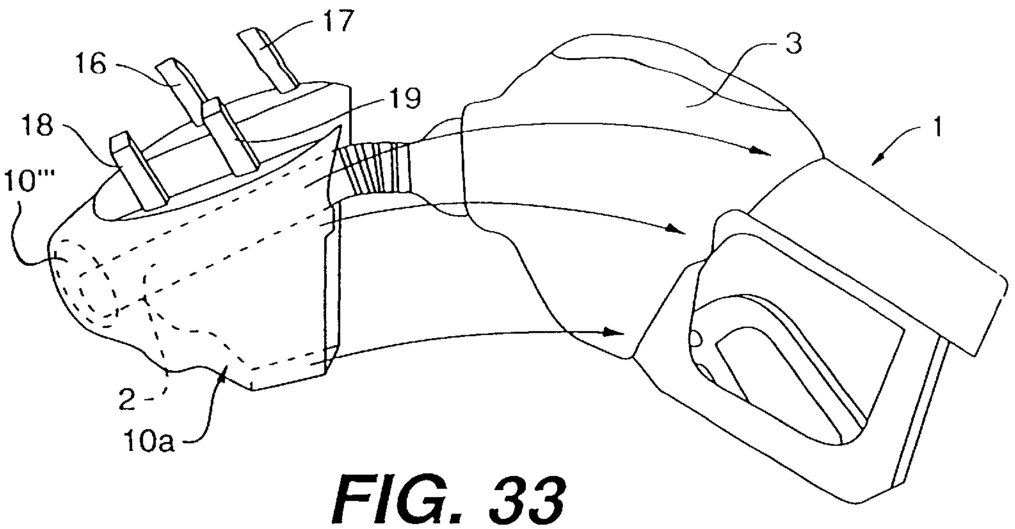
FIGS. 33–35 illustrate fitting of the lower member of the carrying body onto the filler gun when the lower member at its front end region has its side panels integrally joined.

FIGS. 63, 64, 65 and 66 illustrate in rear, front, top, and side views, respectively, a modification of a lower member as shown in FIG. 33. The lower member has side panels 125 and 126, a front panel 127, and a bottom panel 128. The front panel 127 is at its top upwardly open as indicated by reference numeral 127' and with an approximate outline configuration of an inverted letter omega (Ω). The side panel 125 has at its top region upwardly extending male engagement means 129, 130 for engaging female engagement means in an upper member (not shown). Further, the side panel 126 has at its top region upwardly extending male engagement means 131, 132 for engaging female engagement means in an upper member (not shown).

In order to avoid that an upper member be positioned with its front surface backwards onto the lower member and enter into snap engagement in such position, it is advantageous to let the foremost upwardly extending means 129, 131 extend further up than the rearmost upwardly extending means 130, 132, e.g. by a distance h. In the upper member, the corresponding female engagement means must have corresponding depths, such that if means 131 is inserted into female means designed to receive means 130, it will immediately be seen that there is something wrong in that there will be a space between a top region of the side panels and a bottom region of an upper member.

Further, both upwardly extending means 131 and 132 have an abutment edge member 131'; 132' and a hook-like engagement member 131"; 132". Similar members are provided on means 129 and 130. For means 132, the distance between members 132' and 132" is h2. For means 131, the distance between means 131' and 131" is h1, such that suitably h2–h1 is h. The abutment members 131' and 132' are designed to abut a corresponding lower edge (not shown) on a female engagement means on the upper member. Therefore, if the upper member is attempted to be fitted onto the lower member front backwards, means 131 will have its abutment edge member 131' engage a female engagement means on the upper member designed for member 130 before hook member 131" is able to snap engage.

Figure 36:
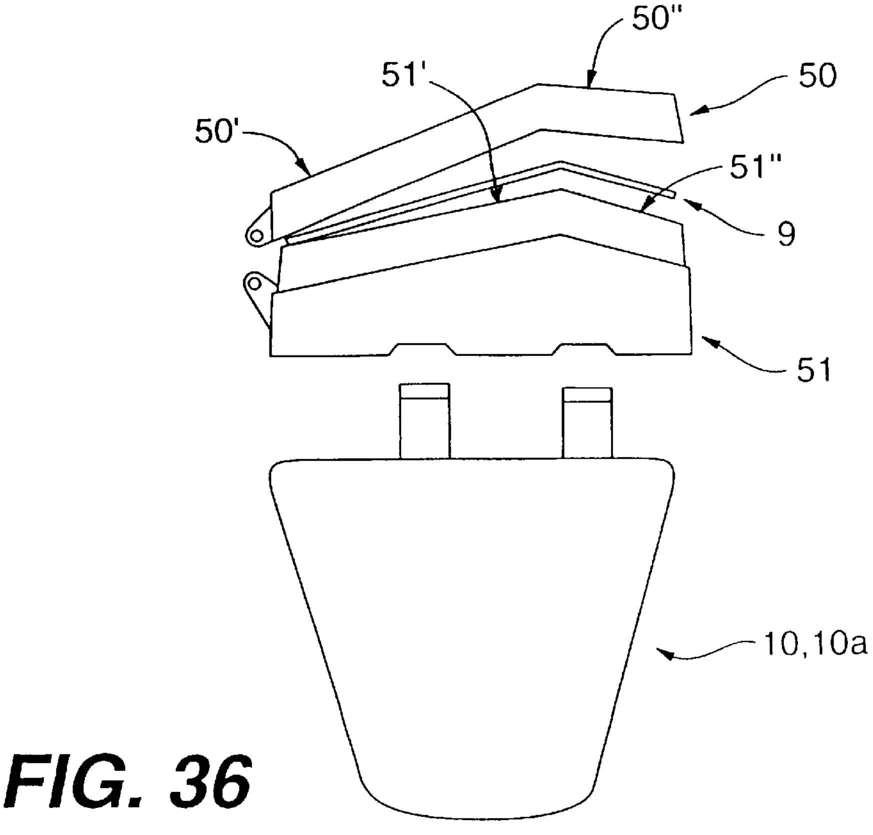
FIG. 36 illustrates a further modification of the two-piece carrying body, and the top member.

FIGS. 12, 14, 17, and 20 show that both the upper surface of the upper member as well as the top member have a curved configuration along its length. However, it is readily conceivable that the top member, as indicated by reference number 50 in the side view of FIG. 36, could have two substantially planar sections 50' and 50" mutually forming an obtuse angle. Similarly, the upper member, here labelled as 51, could have a top surface of similar configuration seen along its length, i.e. two substantially planar, upper surfaces 51' and 51" forming an obtuse angle. Contrary to prior art carrying bodies for a display apparatus which is removably attachable to the filler gun of a fuel pump, the carrying body, in this particular invention a two-piece carrying body, suitably made of a substantially hard plastic material. As an example, a suitable material would be e.g. polyamide. In a prototype, polyamide 66 has proved to be a suitable plastic material.

The top member 27; 34 (37); 49; 50 is suitably made of a substantially hard plastic material which may be transparent or non-transparent. A type of material such as polycarbonate has proved to be suitable in connection with a prototype made of the present apparatus. Suitably, the polycarbonate could be e.g. the make LEXAN®, MAKROLON®, GRILIAMID® or other suitable make.

In the embodiment of the lower member 10*a* as described in connection with FIGS. 33–35, when the lower member is to be fitted onto the gun head of the filler gun 1, the rear portions of the side panels 12, 13 may be pushed slightly away from each other to facilitate pushing and entering of the lower member 10*a* onto the filler gun. Although the lower member is made of a substantially hard plastic material, the wall thickness of the lower member is of such dimension that manipulation of the side panels is possible.

Figure 37:
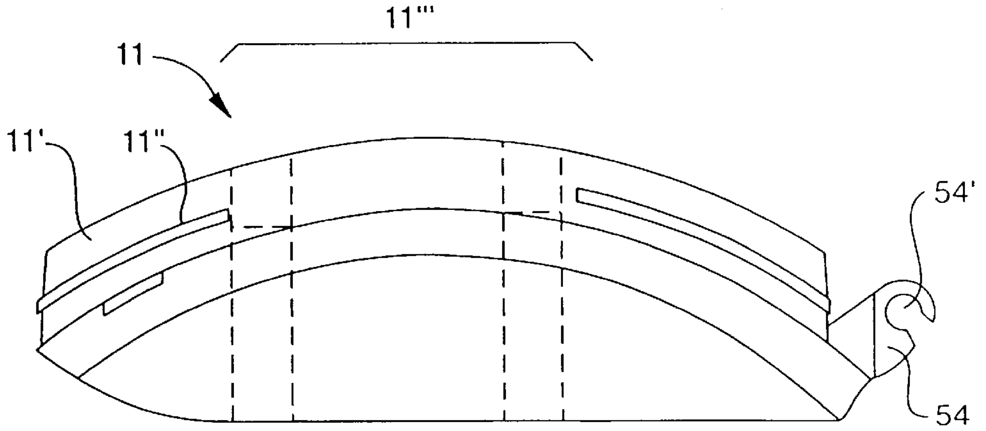
FIGS. 37 and 38 are side and top views of a modified version of the upper member, according to the invention.
Figure 38:
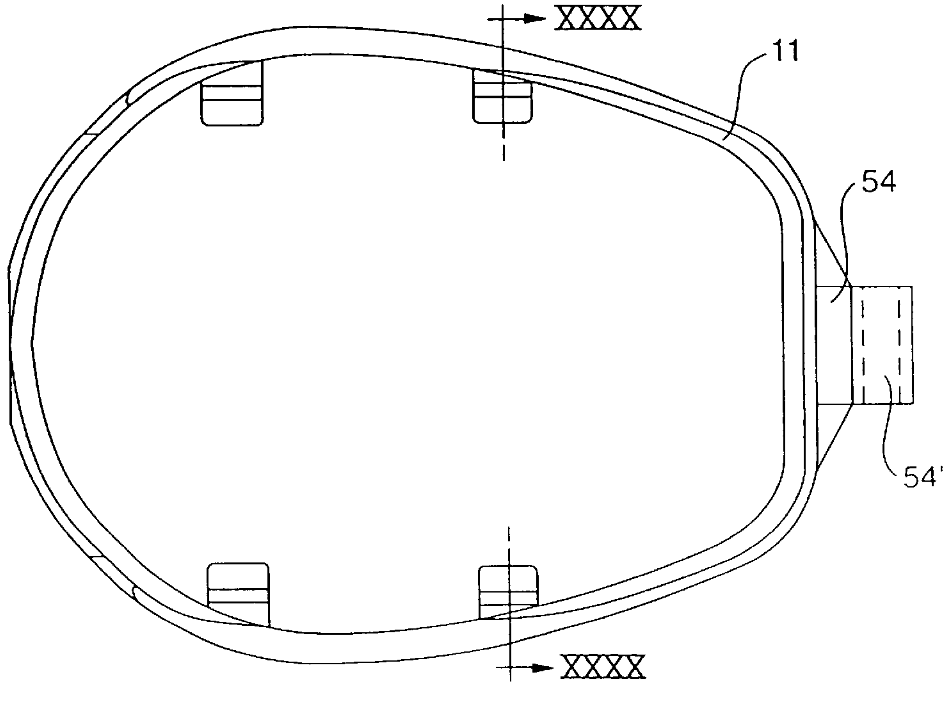
Figure 39:
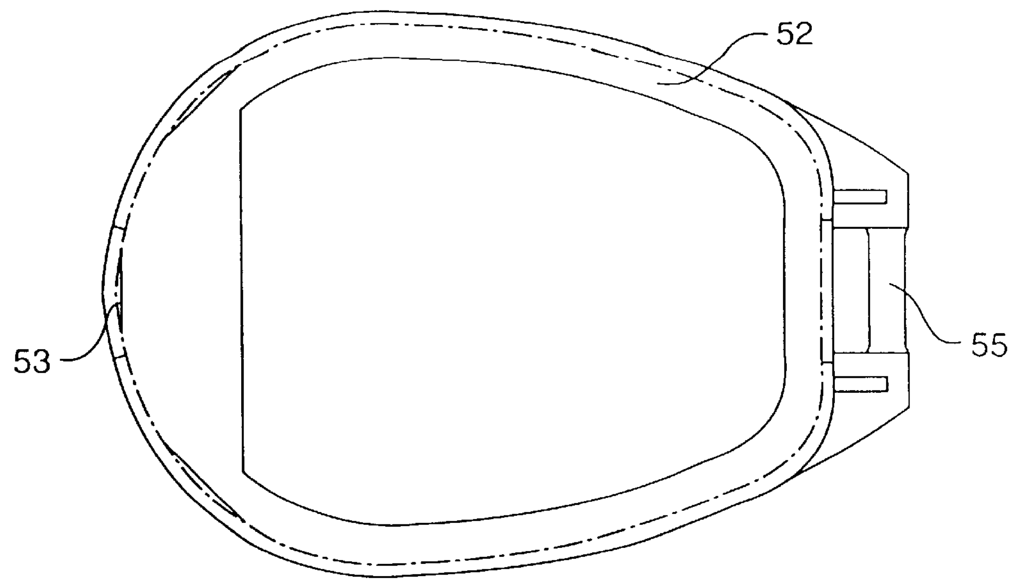
FIG. 39 is a slightly modified version of the frame according to FIG. 19.

Compared with FIGS. 6 and 7, the upper member 11 of FIGS. 37 and 38 have been modified in that a mid-region 11''' of the peripheral portion 11' thereof has its cross-dimension made smaller, inter alia, by removing sections of the peripheral bead 11''. At a rear end, the top member 52, e.g. a frame as shown in FIG. 39, has an engagement member 53, e.g. a bead, for engaging said bead 11'' at the rear end of the upper member 11.

Figure 40:
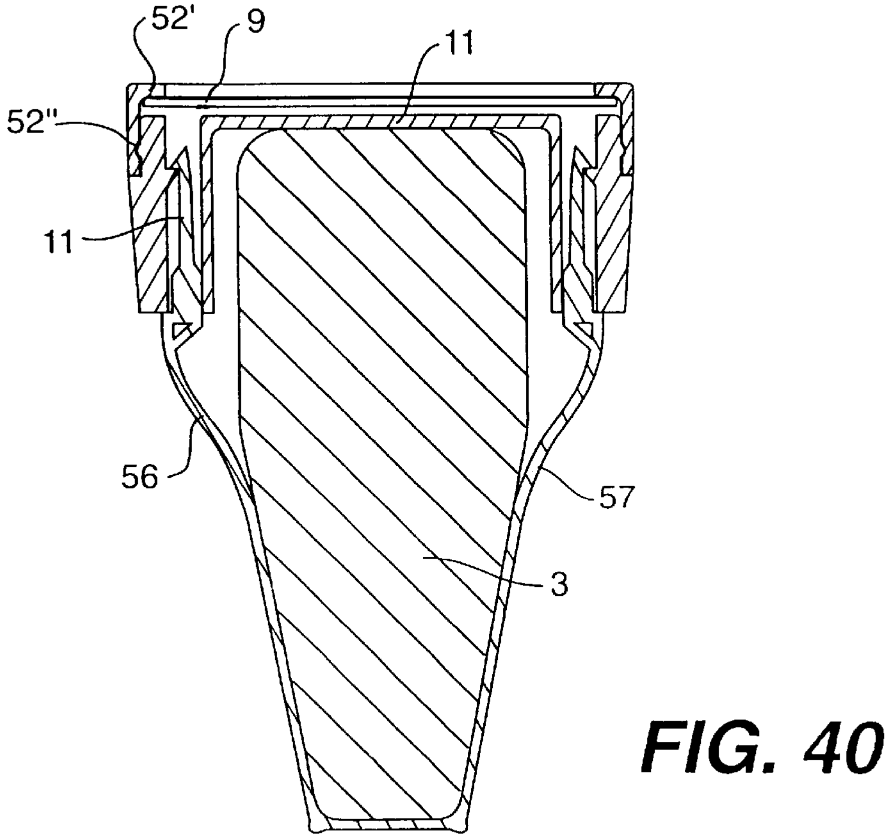
FIG. 40 is a cross-sectional view at XXXX—XXXX of FIG. 38 of the display apparatus according to the present invention, fitted onto a filler gun and with an upper member according to FIGS. 37 and 38.

As shown in FIG. 40, the frame 52 has a horizontal member 52' and a vertical member 52''. Vertical member 52'' is at midsection 11''' of upper member 11 spaced from the outer circumference of the upper member, thus enabling squeezing opposite midportions of the frame towards each other and thereby moving bead 53 in a rearward direction to disengage bead 11''.

At a forward end of the upper member, there is provided a modified first hinge means 54 having a C-shaped cross-section and having a recess 54' for receiving in pivotable engagement a modified second hinge means 55 located at a front end of top member 52.

Figure 57:
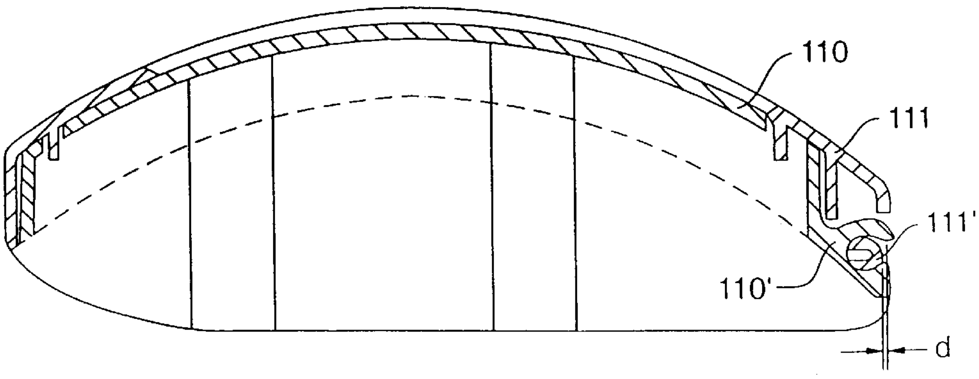
FIG. 57 is a longitudinal cross-section through a frame-shaped top member and an upper member with modified hinge connection means.

FIG. 57 shows in cross-section an upper member 110 with top member 11, e.g. formed as a frame structure. At a front region of said upper member 110, a first hinge means 110' is provided which is snap engagable with a second hinge means 11' at a front region of the top member 111. To accommodate the different thermal expansion and contraction of said top and upper members, which could otherwise result in rear ends of said members 103, 104 becoming disengaged, the first female type hinge means 110' is at a distance d from the front of the second hinge means 111', when it bottoms in the first hinge means 110', to a typical narrow entry portion 110'' of the first hinge means 110, thereby providing for some radial play d of the second hinge means in the first hinge means in a longitudinal direction of the upper member.

Figure 41B:
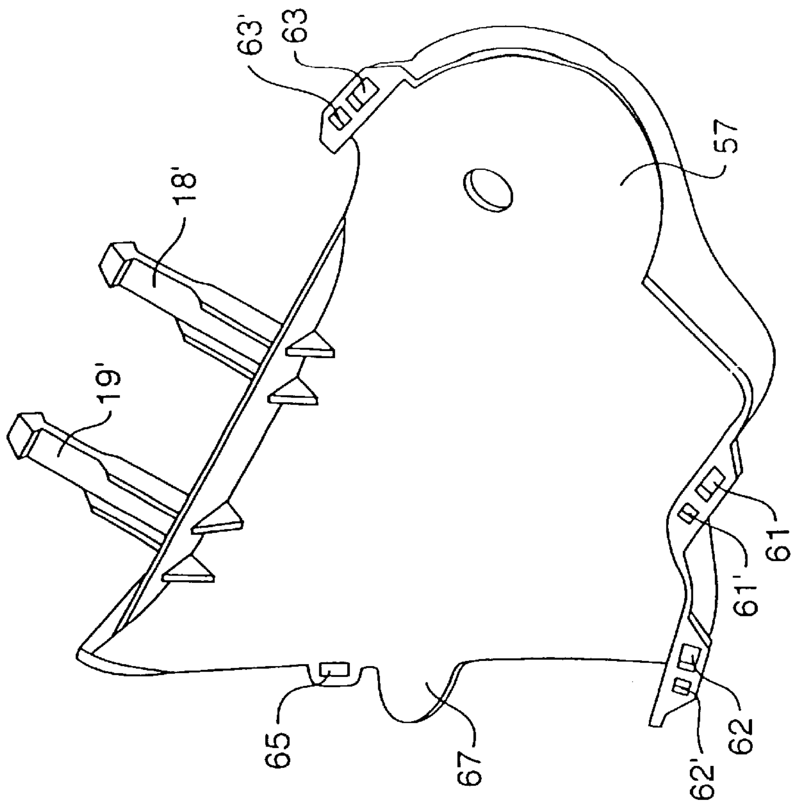
FIGS. 41*a* and 41*b* illustrate separate side panels of a further modified version of the lower member of the display apparatus according to the invention.
Figure 41A:
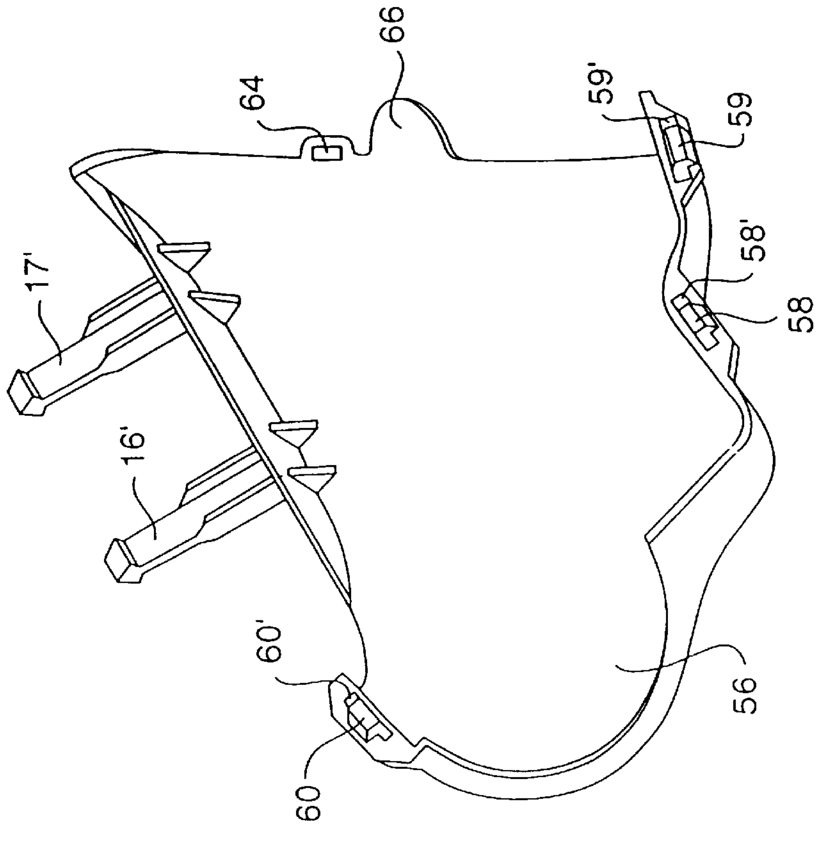
Figure 42:
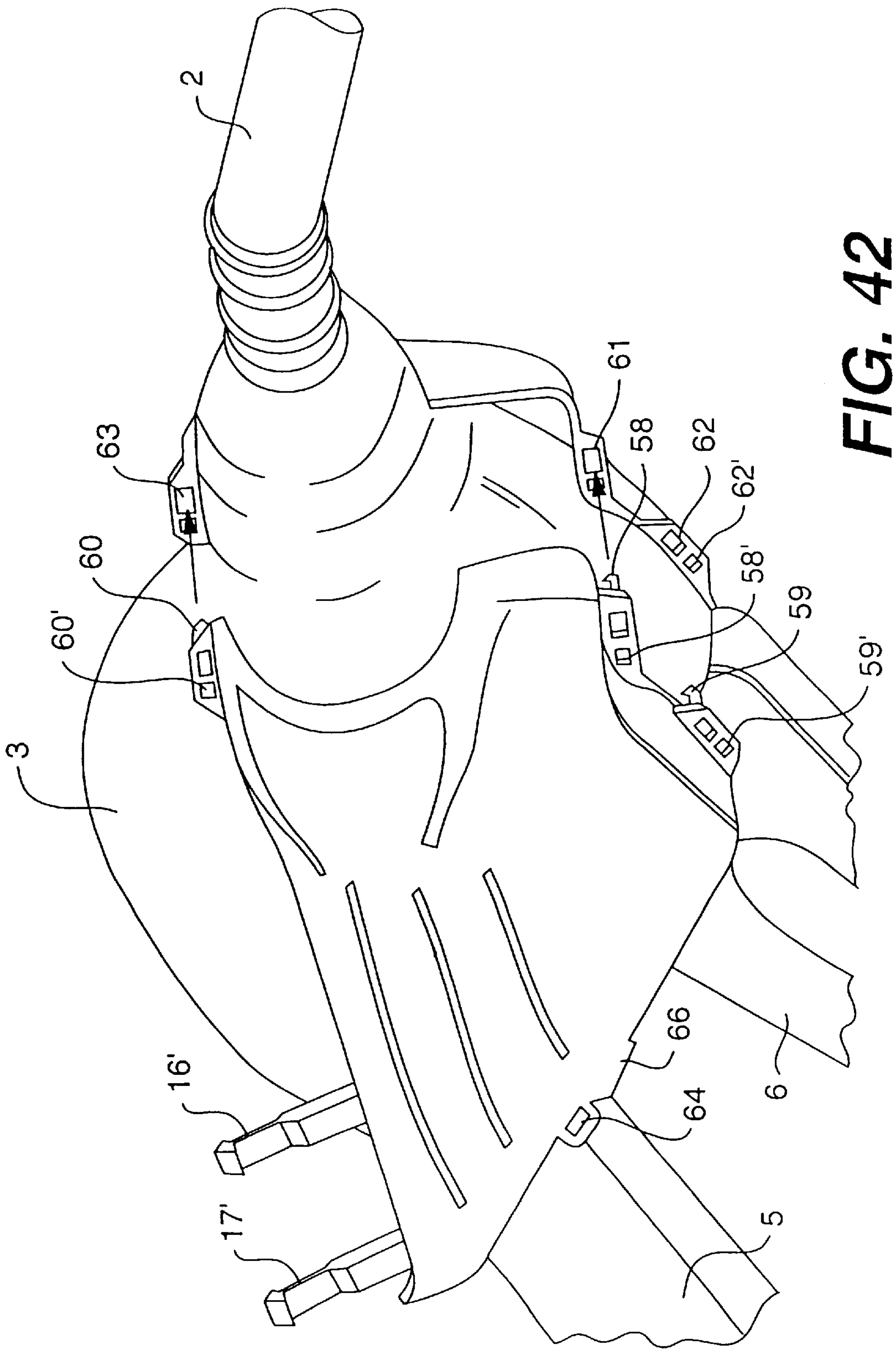
FIG. 42 illustrates installing the side panels of FIGS. 41*a* and 41*b* on a filler gun.
Figure 43:
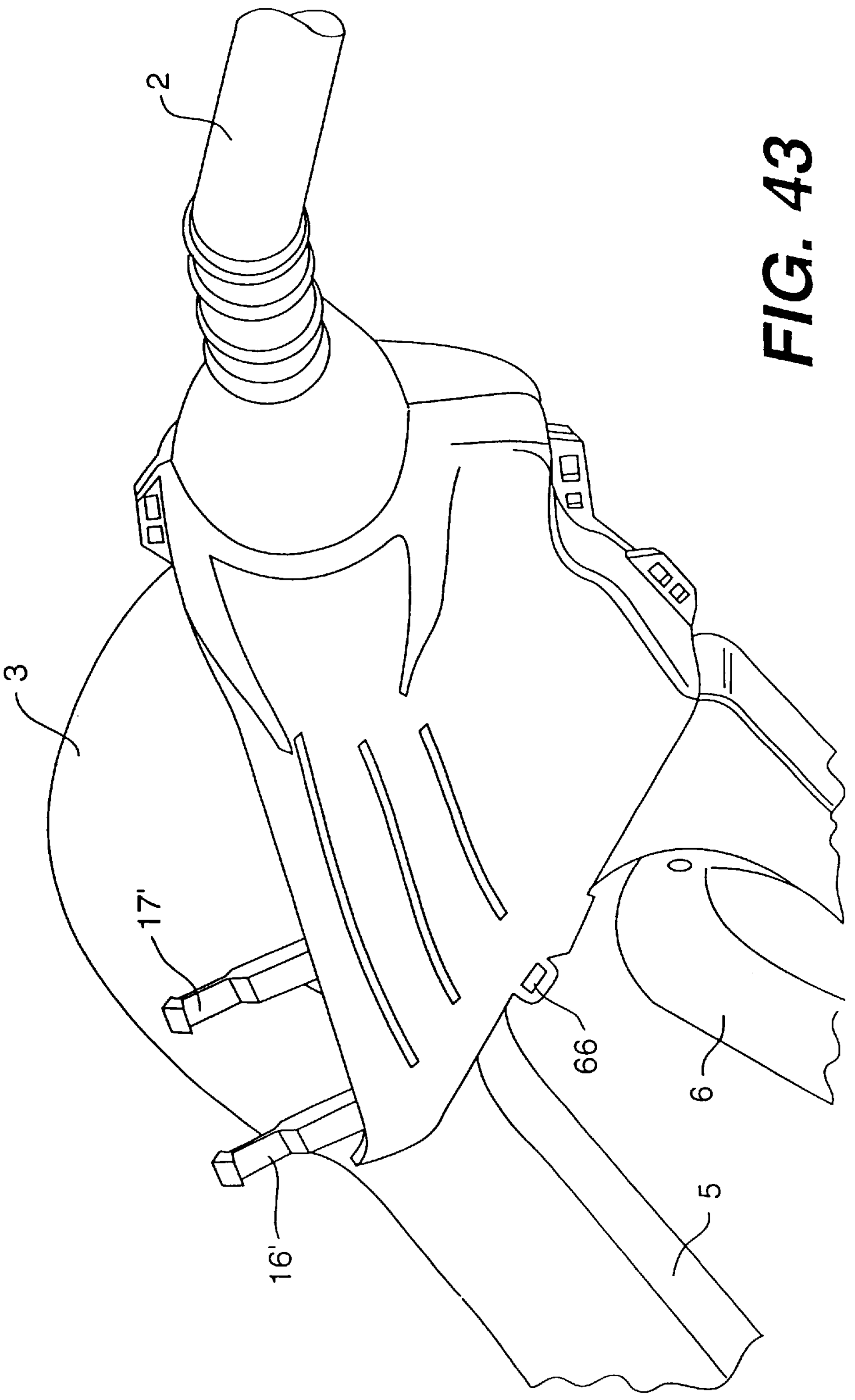
FIG. 43 illustrates a further modified version of the lower member fully installed on a filler gun.
Figure 45:
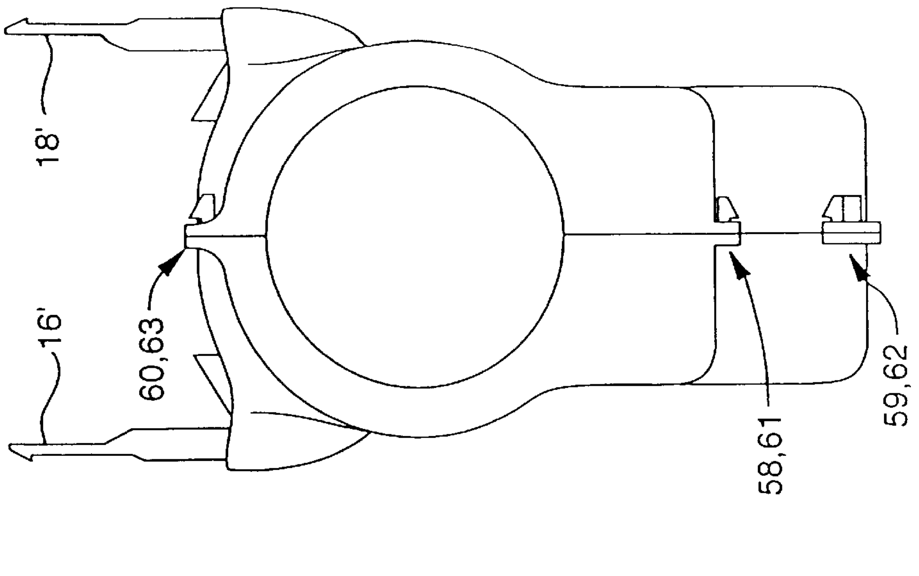
FIG. 45 is a front view of the further modified version of the lower member.
Figure 44:
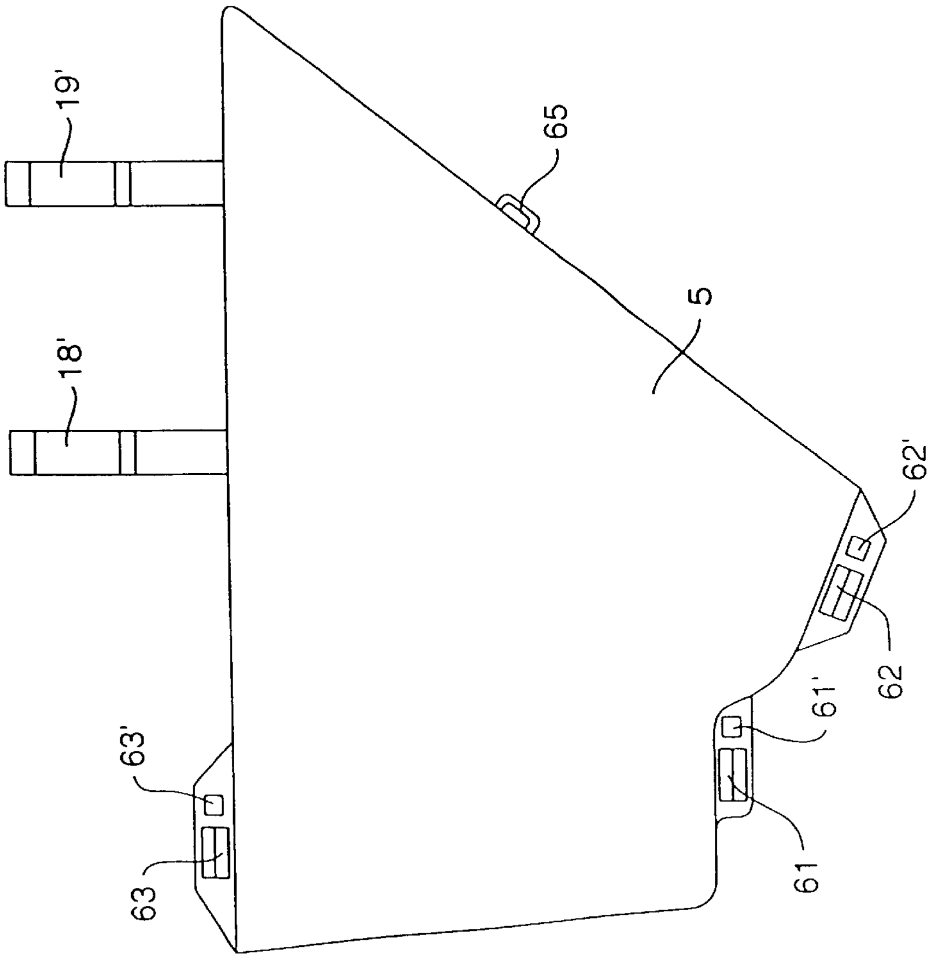
FIG. 44 is an exterior side view of the side panel of FIG. 41*b*.
Figure 46:
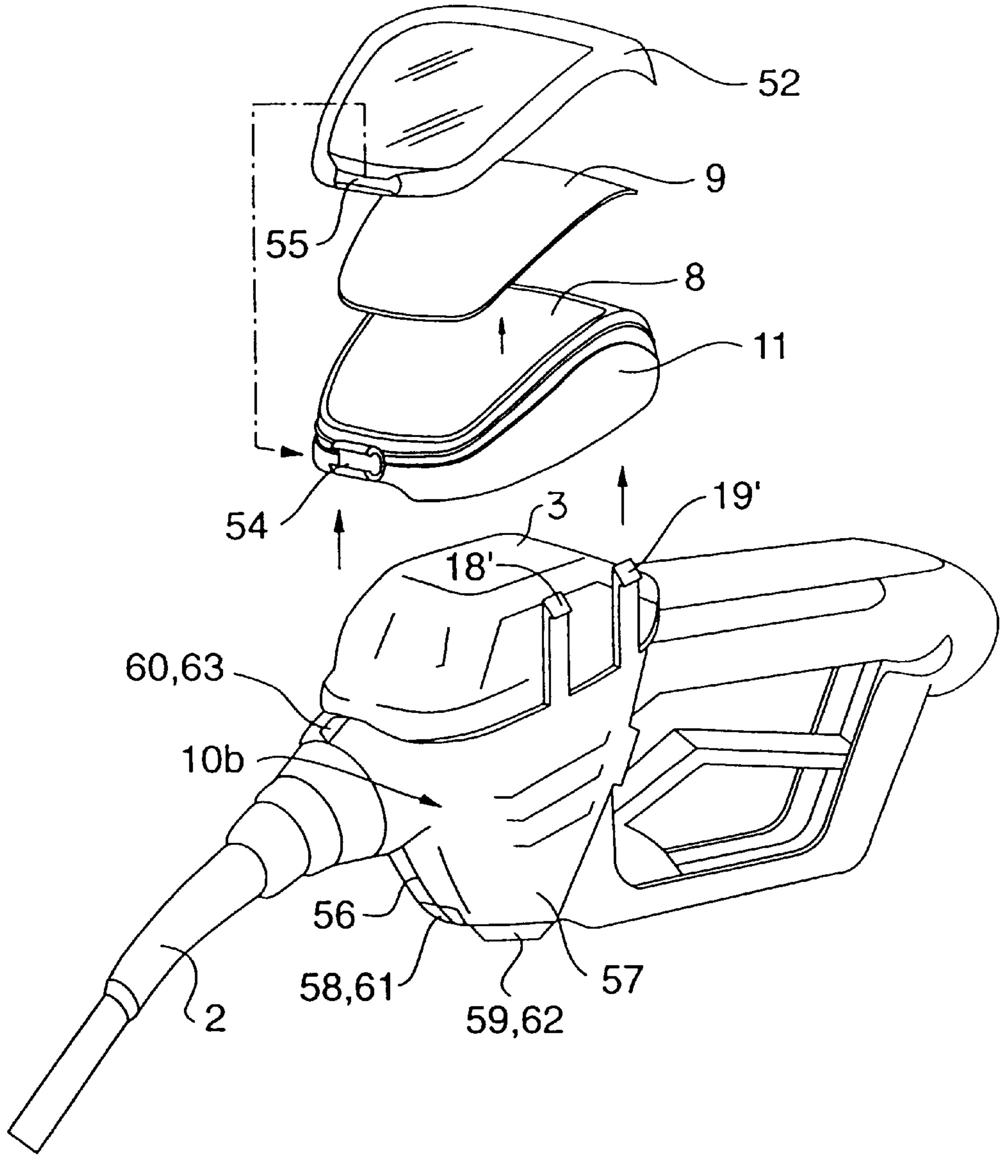
FIG. 46 further illustrates mounting of the modified upper member onto the filler gun and with pivotable engagement of a modified top member with the upper member.

The lower member 10*b* (see FIG. 46) of the display apparatus, in its further modified version, comprises two side panels 56 and 57 as illustrated, for example, in FIGS. 41*a* and 41*b*. Side panel 56 has suitably a number of first interconnecting means 58, 59 and 60. The number of such means could possibly be fewer, e.g. two or be higher, for example, four. Side panel 57 has corresponding second interconnecting means 61, 62 and 63. The first interconnecting means 58–60 are suitably male snap-lock means. The second interconnecting means 61–63 are suitably female snap-lock means.

Next to the respective interconnecting means may be provided holes 58', 59', 60', 61', 62', 63' for inserting conventional self-locking straps in case any of the snap-lock means become defective. At the rear region of the lower member, additional holes 64 and 65 may be provided for engagement with conventional self-locking straps, if so required. Rear, transversely protruding members 66 and 67 are intended for engaging a rear edge region of the gun head. The first interlocking members for engaging the upper member are labelled 16', 17', 18' and 19' in FIG. 41.

Figure 47:
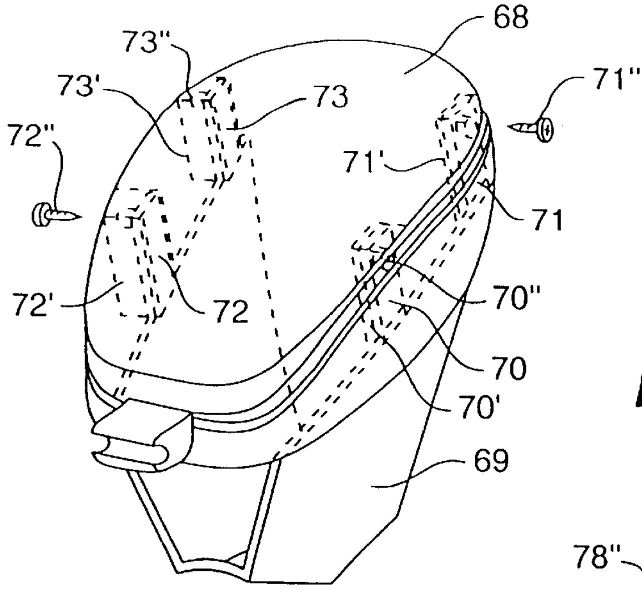
FIGS. 47, 48 and 49 illustrate alternative means for attaching the upper member to the lower member.
Figure 48:
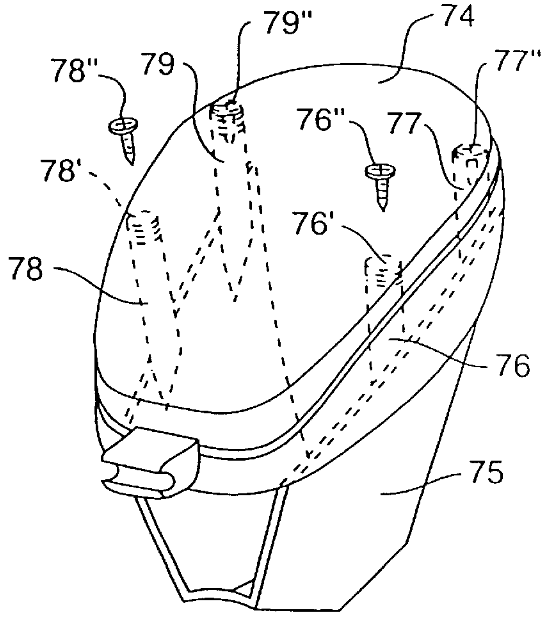
Figure 49:
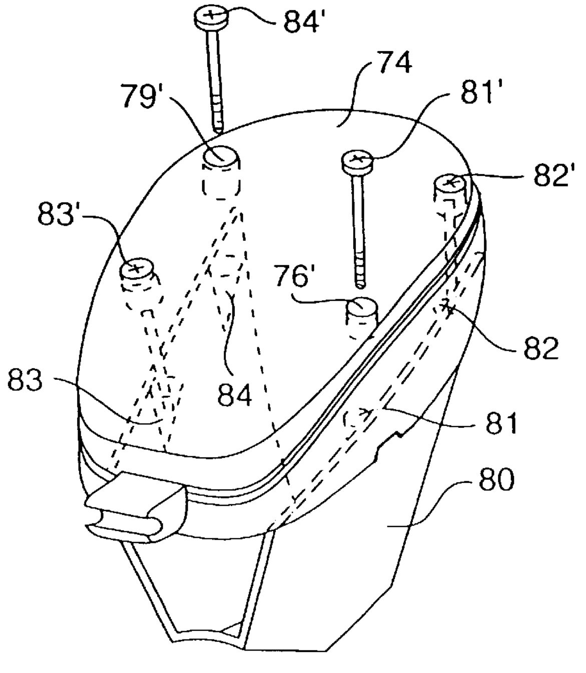

In the previous disclosure, it has been shown to be advantageous to attach the upper member of the display apparatus to the lower member thereof by means of snap engagement, male engagement means extending up from the lower member to engage female engagement means in the upper member. FIGS. 47–49 illustrate alternative means for providing attachment of the upper member with the lower member.

In FIG. 47, there is provided a lower member 69 having at the top of its side panels uprights 70, 71 72, 73 extending into pockets 70', 71', 72' and 73', respectively in an upper member 68. Screws 70'', 71'', 72'', 73'' extending through an upper side edge region of the upper member 68 and into said upright secure said uprights to 70–73 to the upper member 68. In FIG. 48, upper member 74 is attached to a lower member 75. The lower member has at the top of its side panels uprights 76, 77, 78, 79. In the top face of upper member 74, there are holes, such as holes 76' and 68' to be aligned with said uprights. Screws 76'', 77'', 78'' and 79'' extend through said holes and engage said uprights 76–79. In the further alternative of FIG. 49, there are no uprights; instead, a lower member 80 is provided with lugs 81, 82, 83, 84 for screw-engagement with long screws 81', 82', 83', 84' extending through holes 76', 77', 78', 79''. The upper member 74 may be identical to that shown in FIG. 48.

Figure 54:
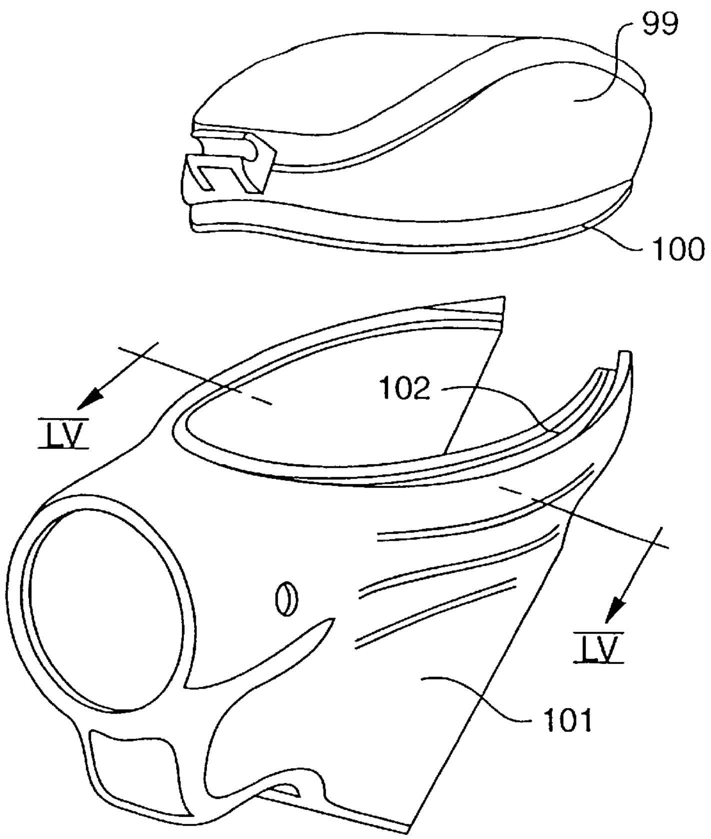
FIGS. 54 and 55 illustrate in perspective view and cross-section, respectively, further alternative means for attaching an upper member to a lower member.
Figure 55:
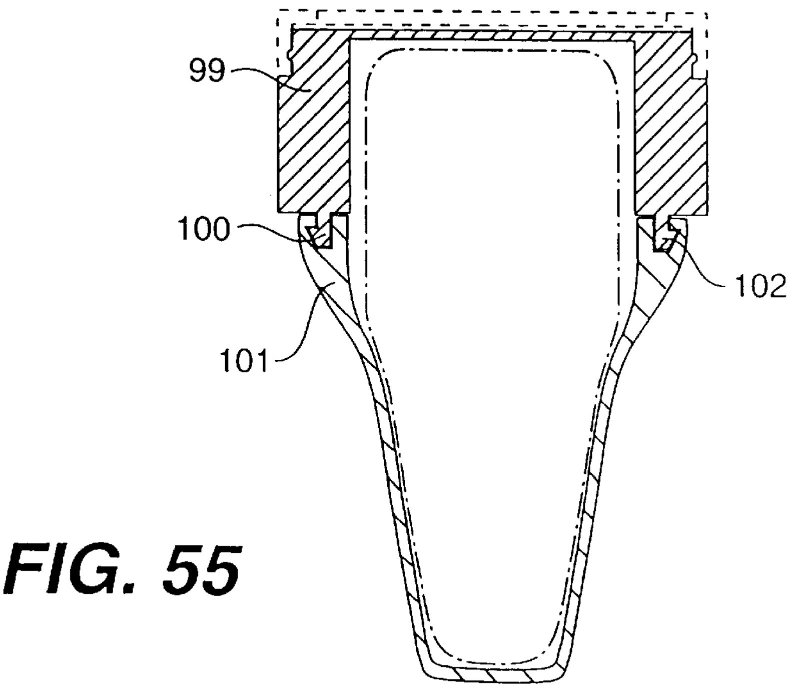

A further variant of snap-engagement between the upper member and the lower member could be as shown in FIGS. 54 and 55, FIG. 55 showing a cross section of the assembly in FIG. 54 at approximately the position line LV—LV. An upper member 99, with a general configuration similar to that shown for other embodiments of the upper member has, along at least part of the lower circumference thereof, second snap-engagement means 100, e.g. male-type snap-engagement means. A lower member 101 of general configuration as shown and described earlier, however, with no engagement uprights, has at its upper, substantially U-shaped rim or edge a first snap-engagement means 102, suitably in the form of female type snap-engagement means. By this embodiment, it is possible to obtain an excellent connection between the upper member and lower member. For the sake of simplicity, a top member has not been indicated in FIG. 54.

In those cases where a display message is to be kept for a rather long time on the apparatus, or where there is a need for more tamper-proof attachment of the top member to the upper member of the apparatus, the embodiments according to FIGS. 50–53 may prove useful.

Figure 50:
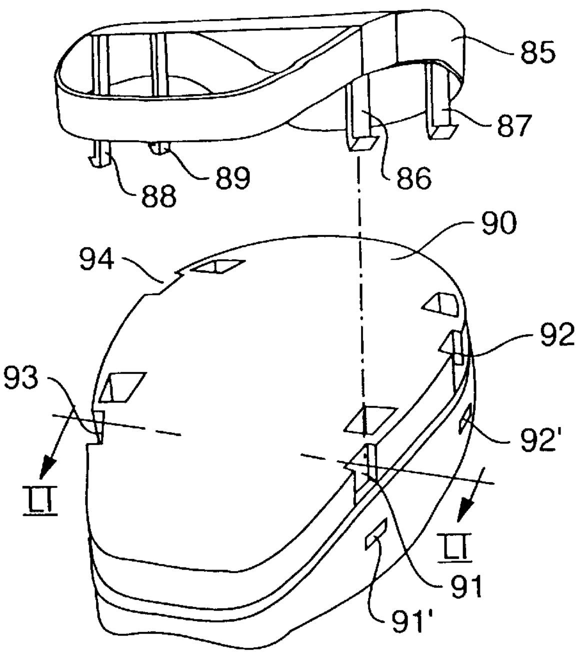
FIGS. 50–53 illustrate alternative means for attaching a top member to an upper member of the present display apparatus.

In FIG. 50, there is shown a top member 85 in the form of a transparent lid. Member 85 has, in its preferred embodiment, four depending male snap-engagement means 86, 87, 88, 89 intended to engage female snap-engagement means 91, 92, 93, 94, respectively, located at an upper circumferential region on an upper member 90. To release the top member 85 from engagement with the upper member 90, a tool, such as e.g. a screwdriver may be inserted into a hole below said means 91–94, e.g. as shown in the form of holes 91' and 92'.

Figure 34:
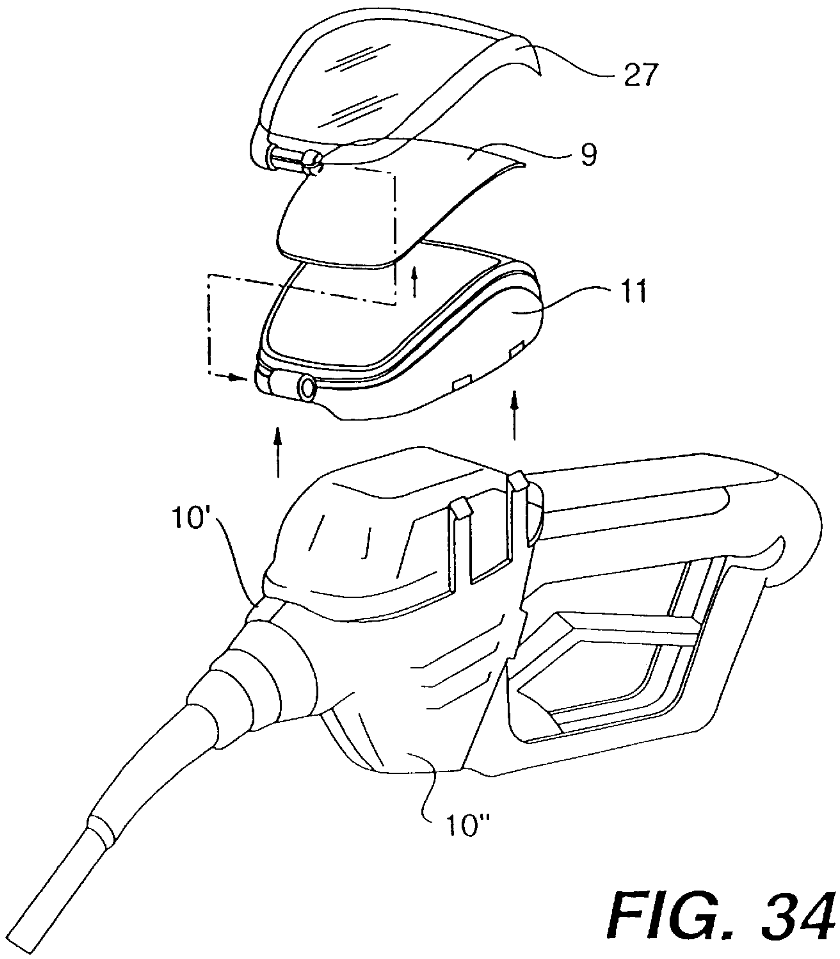
Figure 35:
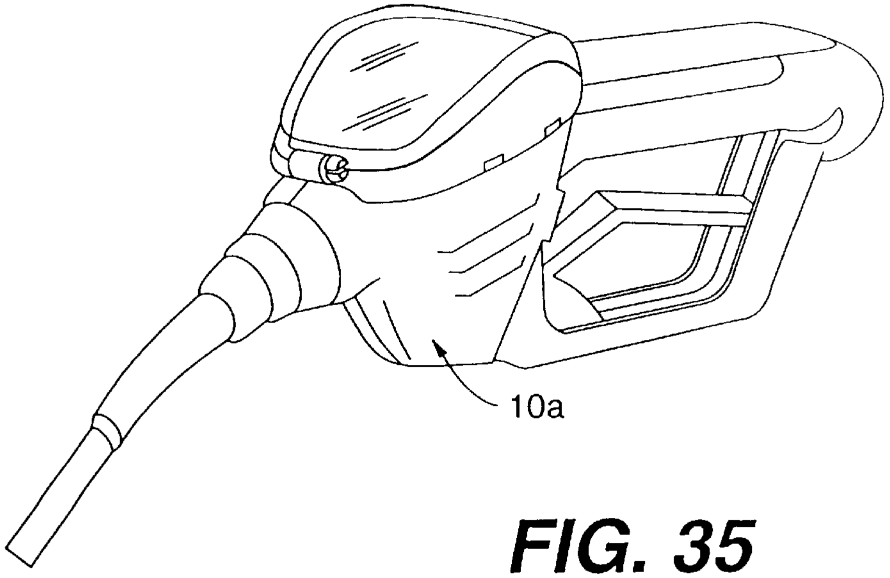
Figure 51:
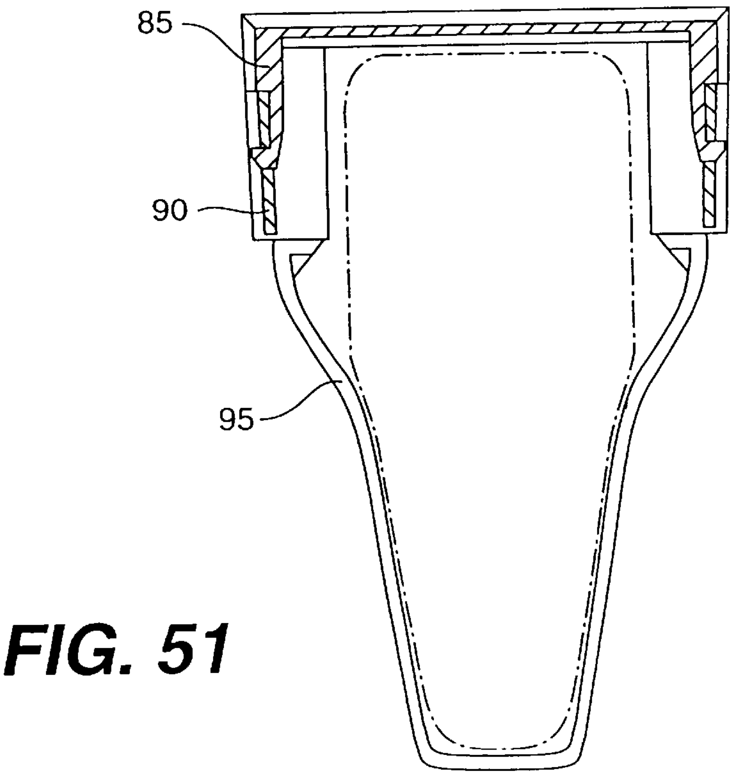

FIG. 51 is a cross-section through the top member 85 and upper member 90 at position line LI—LI in FIG. 50, and with a lower member 95 attached to the upper member in a manner as described e.g. in connection with FIG. 34.

Figure 52:
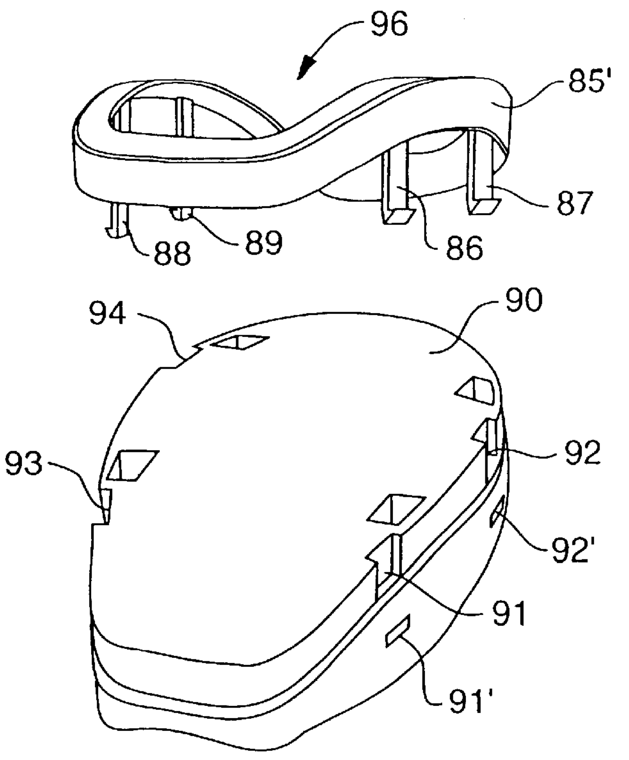

FIG. 52 shows the same attachment means as shown and described above, apart from the top member 85' not being a transparent lid, but rather a typical frame structure such as generally described, for example, in connection with FIGS. 16–22, the frame structure having an opening denoted by 96.

Figure 53:
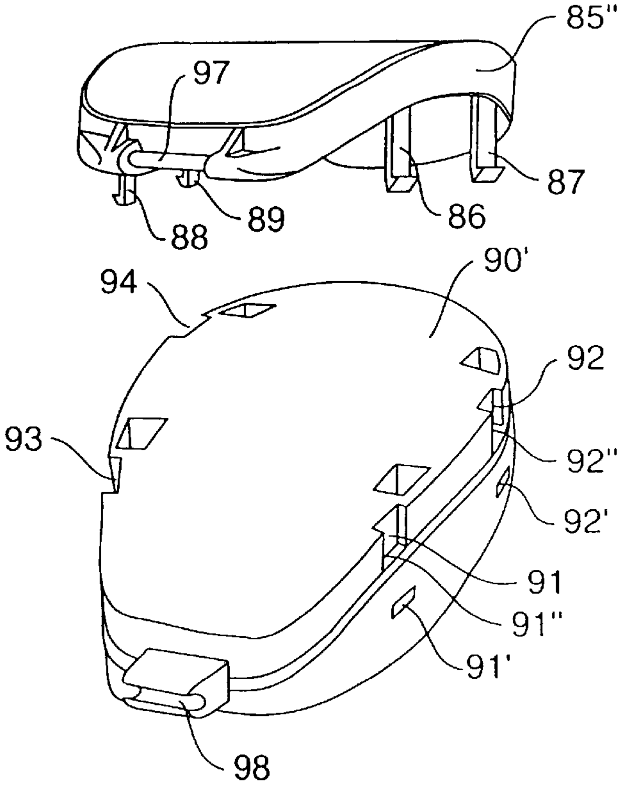

The embodiment of FIG. 53 is, in principle, the same as that shown and described above for FIG. 50, with the exception, however, that a forward end region of the upper member 85'' is provided with a first hinge means intended to engage a second hinge means 98 at a forward end of the upper member 90'. Because movement of the top member 85'', due to an established hinge connection with the upper member 90', describes an arc rather than a rectilinear movement used for the embodiments of FIGS. 50 and 52, upper forward region of the female snap engagement means 91–94 must be wider, e.g. as indicated at 91'' and 92'' to accommodate for such arcuate movement of the male snap engagement means 86–89. Although FIG. 53 shows a typical lid structure for the top member, a typical frame structure could be envisaged.

Figure 56:
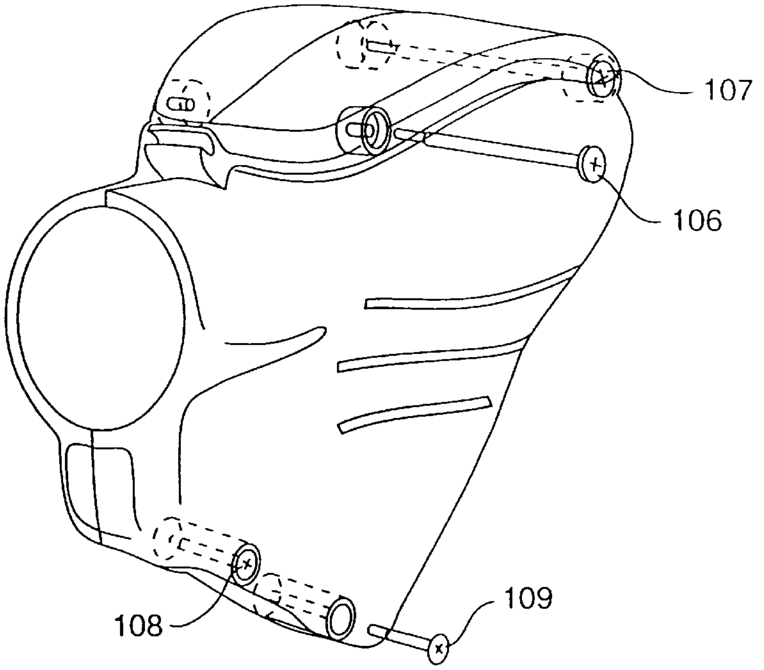
FIG. 56 is a perspective view of an alternative embodiment of the present invention having two structural halves joined by engagement means.

FIG. 56 shows an embodiment of the present invention in which the upper and lower members are divided along a longitudinally extending vertical plane to form two structural halves 103 and 104, each having an upper member half 103'; 104' integral with a lower member half 103"; 104". The two structural halves 103, 104 may be joined by engagement means, such as, for example, screws 106, 107, 108, 109.

Figure 58:
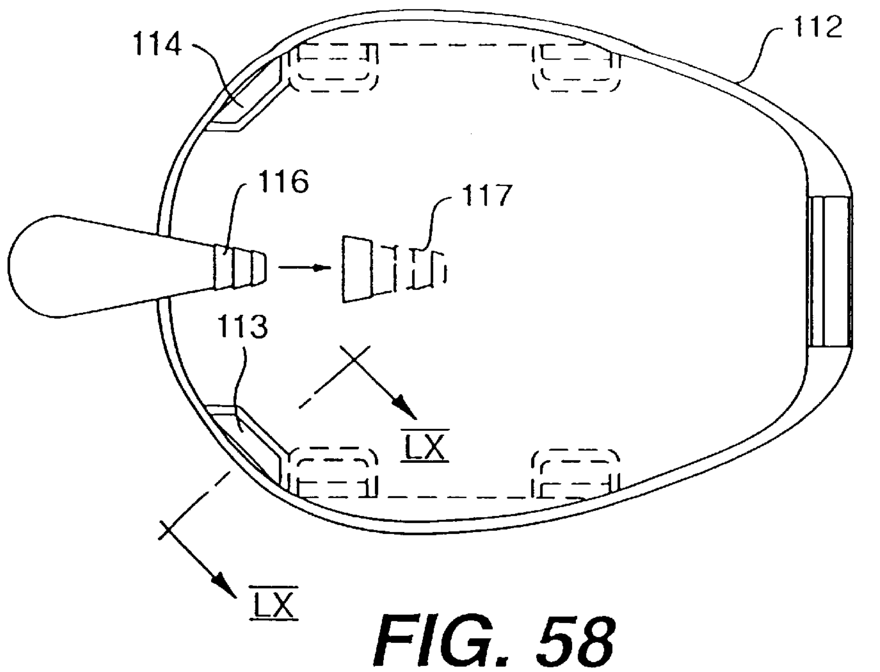
FIGS. 58 and 59 are top and side views, respectively, of an upper member having spring means.
Figure 59:
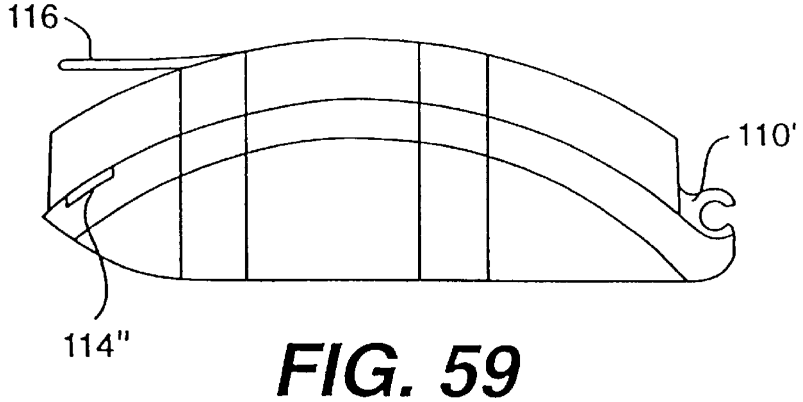
Figure 60A:
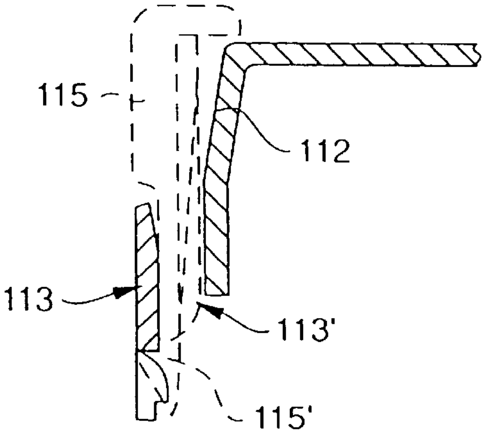
FIG. 60*a* is a cross-section at LX—LX in FIG. 58.
Figure 60B:
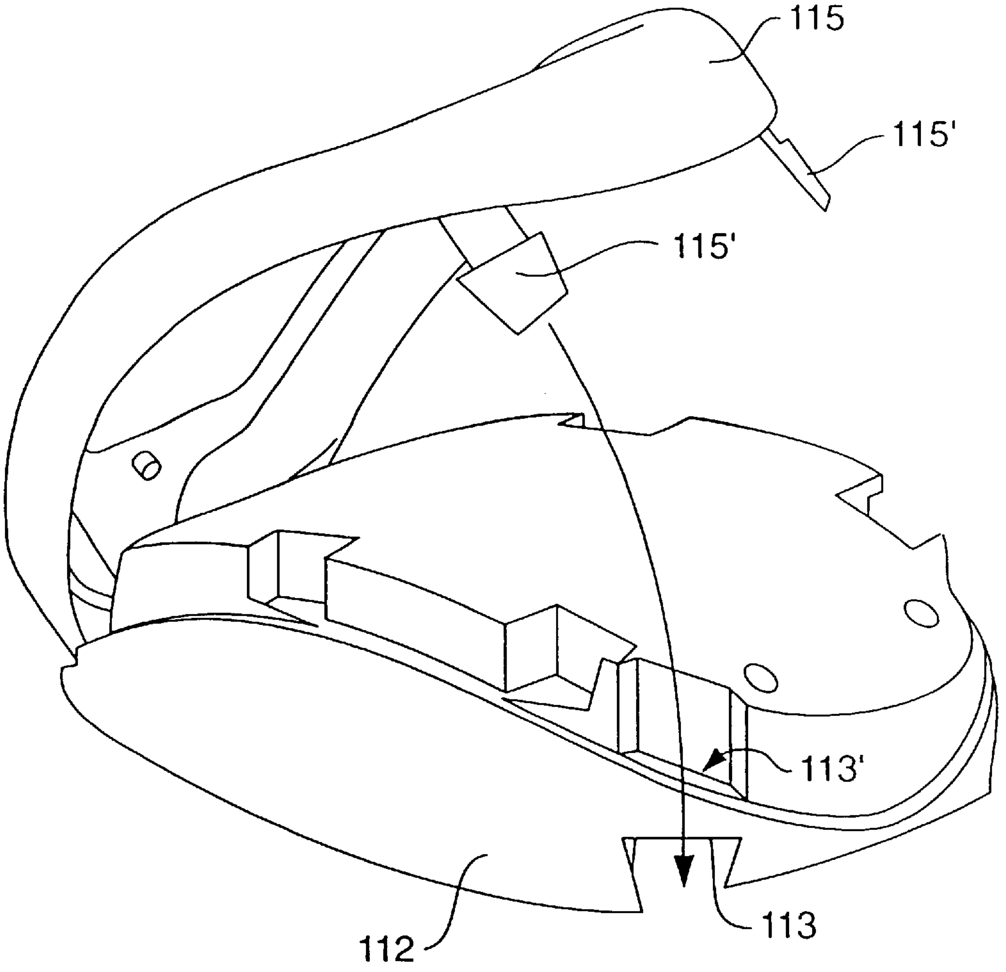
FIG. 60*b* shows a perspective view of the rear snap engagement arrangement between the top member and the upper member of the apparatus.

To avoid, as far as possible, the rear ends of the top and upper members becoming unintentionally disengaged, and further causing the top member to tilt somewhat upwardly about hinge member 110' when released at its rear end from engagement with the upper member, the invention is now to be described with further reference to FIGS. 58–72, FIGS. 60*a* and 60*b* showing a cross-section at LX—LX in FIG. 58.

In FIG. 58 there is provided at the rear end of an upper member 112, female snap-engagement means 113, 114. When a male snap engagement means 115' on a top member 115 of the apparatus is located in and pushed into e.g. hole 113' of means 113, the two means will snap-engage, as indicated on FIGS. 60*a* and 60*b*. In order to release the rear end of the top member from the end region of the upper member, a tool may be inserted through a hole in a side wall of upper member 112, such as hole 114" to move the hook-like engagement means 115' away from engagement with the means 113. Thus, it will take some effort to tamper with the top member 115 to disengage it from the upper member 112.

Figure 61:
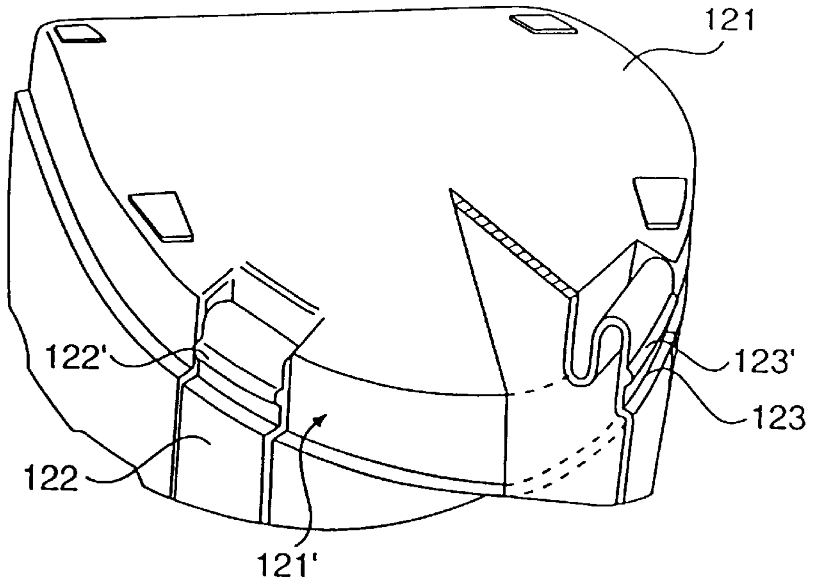
FIG. 61 illustrates means on an upper member for releasably engaging a rear part of a top member.
Figure 62:
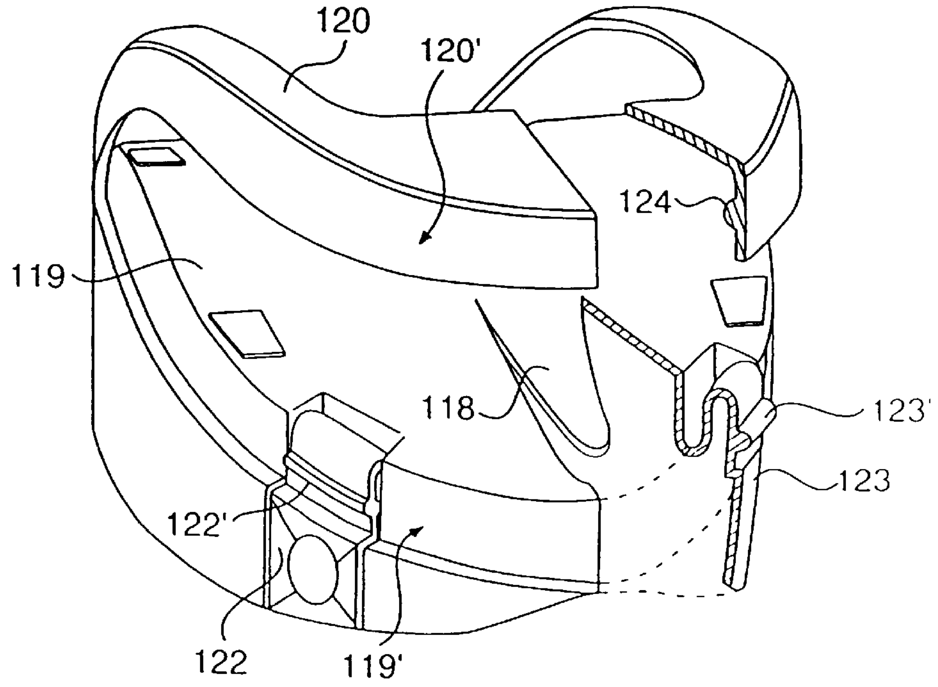
FIG. 62 is a modification of the embodiment shown in FIG. 61.
Figure 63:
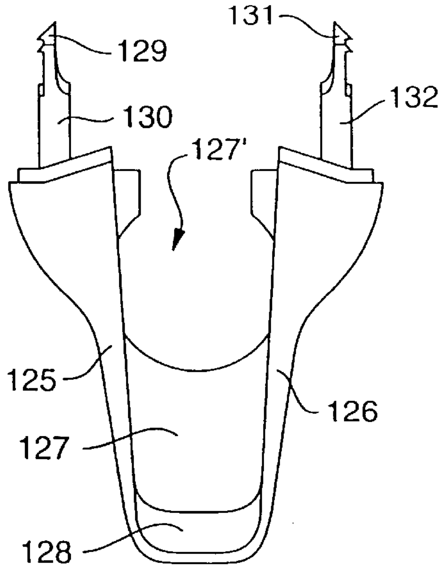
FIGS. 63, 64, 65 and 66 show in rear, front, top, and side views, respectively, a modification of the lower member shown in FIG. 33.
Figure 64:
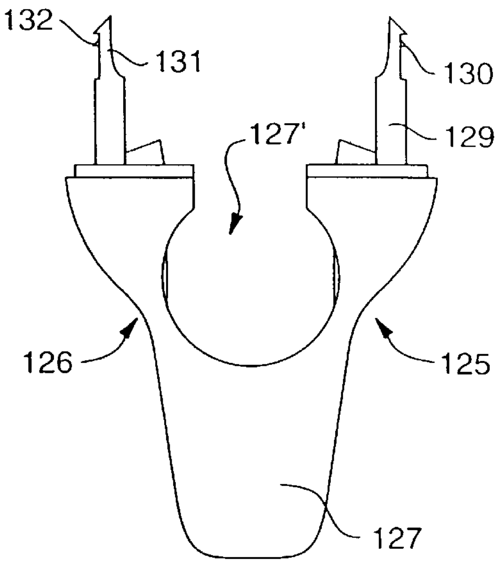
Figure 65:
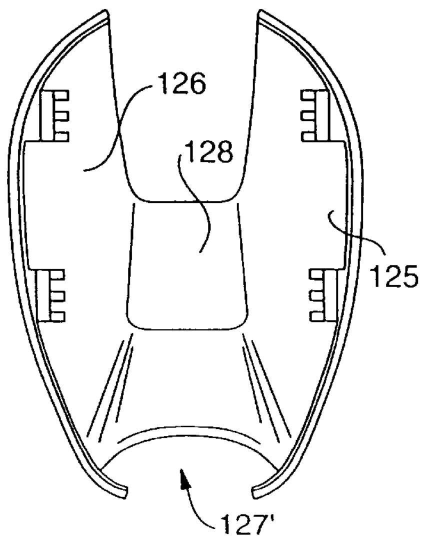
Figure 66:
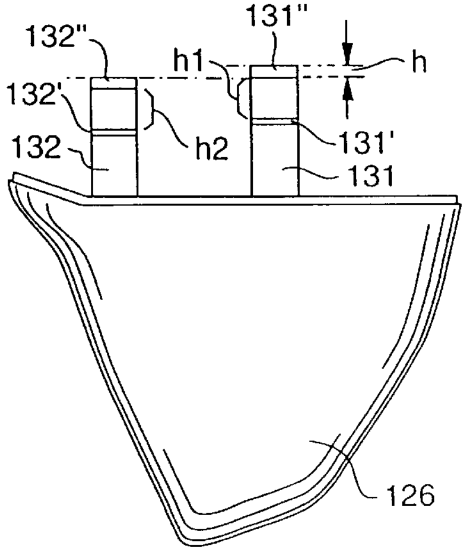

Whenever it is desirable to “open-up” the top member to replace a message card with a new one, FIG. 62 illustrates how a spring means 116 may bring the top member to a desired tilt angle. The spring means 116 can be fixed with one end in a pocket in the top surface of the upper member 112 which can be in the form of a spring means 118 partly stamped out of a top face of upper member 119 and bent slightly upwardly. The upper member could instead be without such spring means, e.g. as shown in FIG. 61. In order to detachably lock a rear part 120' of top member 120 to a rear part 119'; 121' of the upper member 119; 121, respectively, there are provided at the rear part 119'; 121' engagement means 122; 123 having a bead 122'; 123' which is snap-engagable with a bead 124 on the inner circumference of the top member 120. By pushing in said engagement means 122; 123, it is possible to release said snap-engagement. However, both engagement means 122, 123 must be operated in order to release fully the snap-engagement between said rear part 120' of the top member 120 and the rear part 119' or 121' of the upper member 119 or 121.

Figure 70:
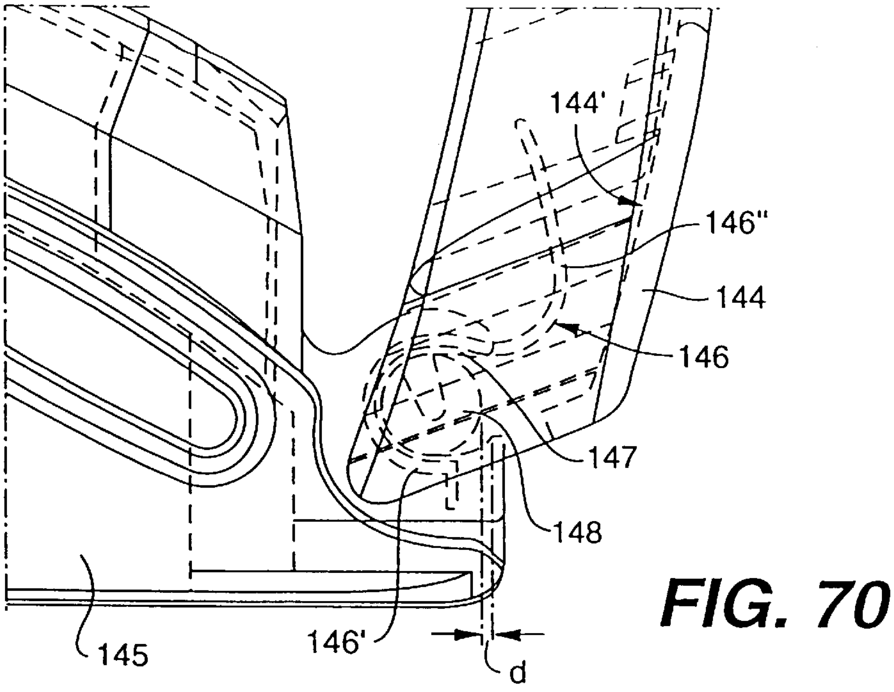
FIG. 70 illustrates a spring means located at a hinge arrangement between the top member and the upper member.
Figure 71:
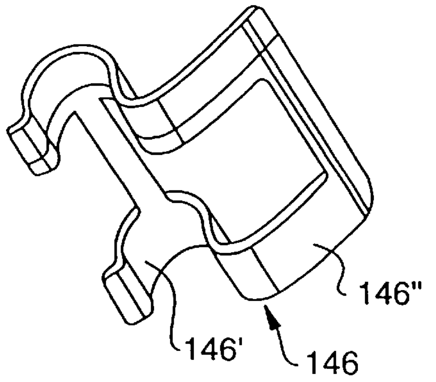
FIG. 71 illustrates a typical embodiment of the spring means of FIG. 70.
Figure 72:
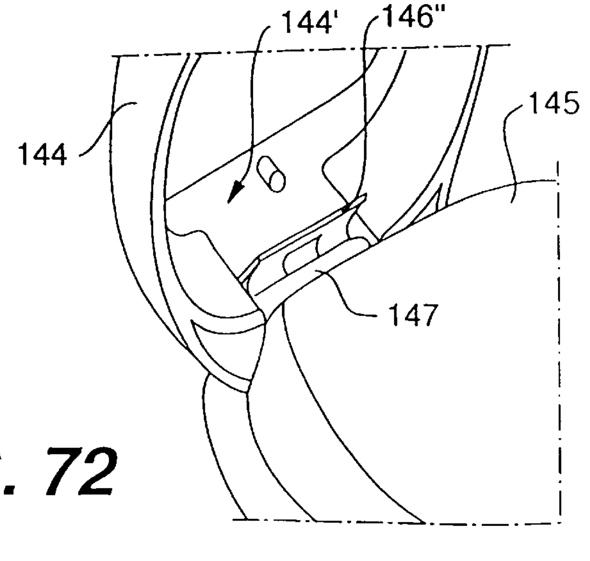
FIG. 72 illustrates in perspective view the spring means of FIG. 70 when installed.
Figure 73:
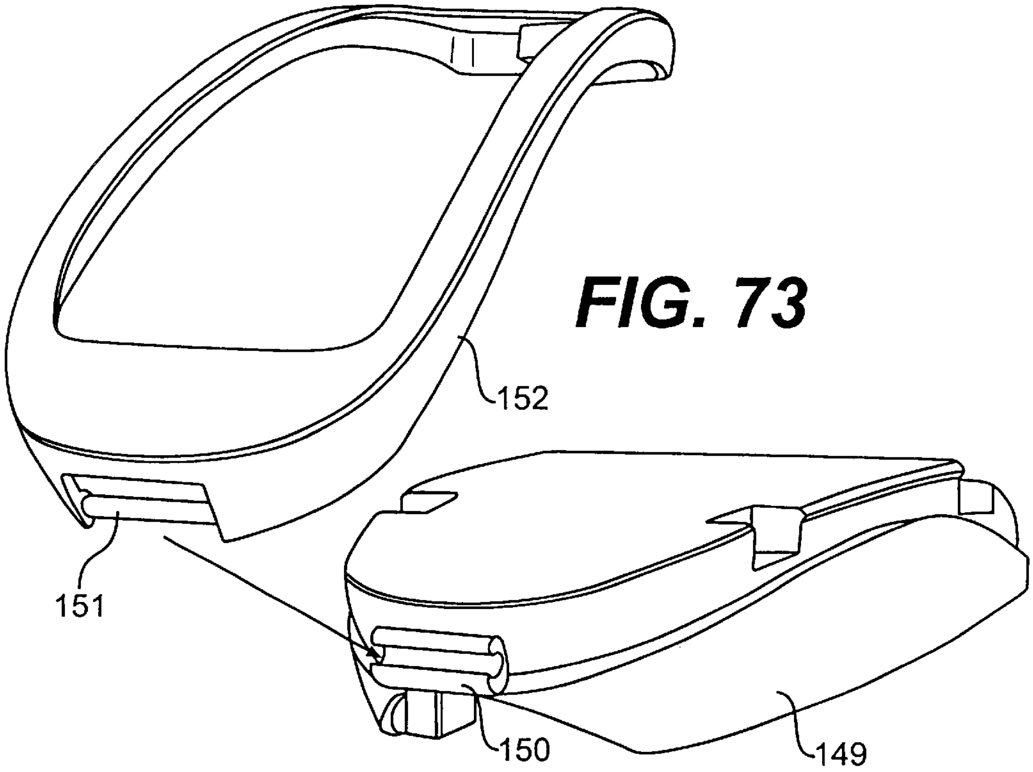
FIGS. 73 and 74 illustrate rear perspective views of assembling of a modified top member to a modified upper member.
Figure 74:
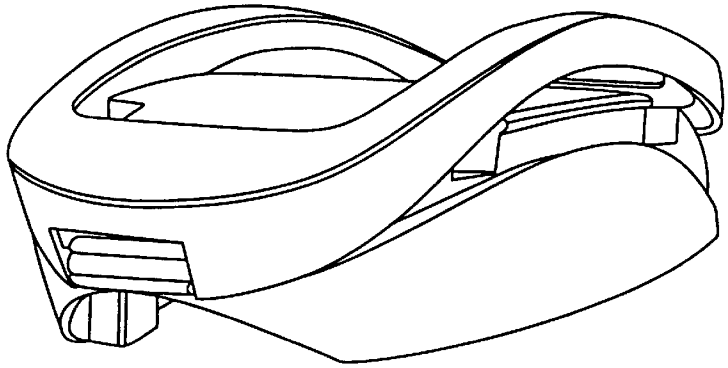
Figure 75:
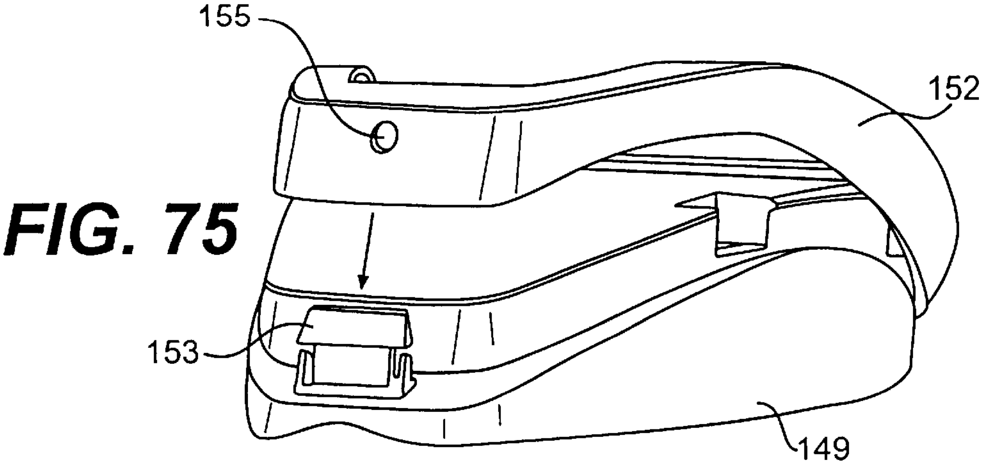
FIGS. 75 and 76 illustrate a front perspective view of assembling of a modified top member to a modified upper member.
Figure 76:
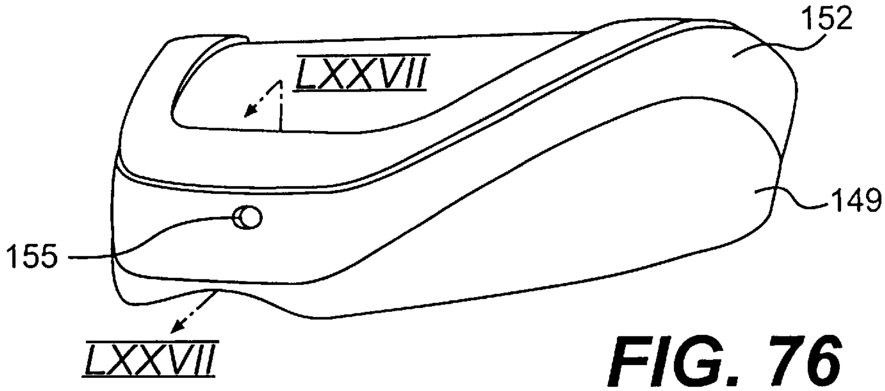
Figure 77:
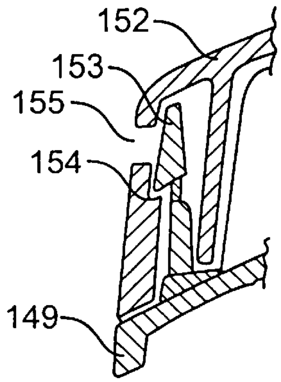
FIG. 77 is a cross-section LXXVII—LXXVII of FIG. 76.

Instead of providing spring means at the rear region of the upper member to bring the top member so as to tilt slightly upwardly when the rear region of the top member 144 (as shown in FIGS. 70 and 72) is disengaged from the rear region of the upper member 145, it may be just as convenient to provide a spring element 146 which is to be located at a front region of the upper member 145, forming with a section of said element, at least partly, almost an inner lining of the female hinge member 147 located at the front of the upper member 145, as more clearly seen from FIG. 70. Thus, the spring element has a lower portion 146' fitting into said female hinge member 147 and an upper, substantially upright portion 146" which can engage with some spring force tension a lower side 144' of the top member when said top member is turned to the left, as seen in FIG. 70 (or to the right when viewing FIG. 72). The male hinge member 148 as shown in FIG. 70 fits snugly into the female hinge member 147, and it is clearly seen the radial play d available to the member 148, as discussed in connection with FIG. 57.

As indicated in e.g. FIGS. 4, 5, 21, 22, 30, 34, 36, 46, 60*b*, 67 and 69, it is possible to have the top member hinge connected to the upper member at a front end of the upper member. Although twin snap lock means could be provided at the rear end of the upper member to avoid accidental or deliberate tampered lifting of the top member rear end, it may, however, prove desirable to provide an even more tamper-proof connection between a top member and an upper member.

Accordingly, an arrangement as that shown in FIGS. 73–77 is proposed. An upper member 149 has a female hinge means 150 provided at a rear end of the upper member 149 for receiving a male hinge means 151 provided on a top member 152 at a rear end thereof. The top member could be of any suitable configuration and not necessarily limited to a frame-like structure as shown.

A hook-like engagement means 153 is located at a front end of the upper member 149 and is so desired as to snap-engage with a ledge or offset 154 at the inside front end of the top member 152. In order to disengage an engagement between the hook-like means 153 and the ledge or offset 154, a pin or other tool, e.g. a thin screwdriver (not shown) can be pushed through a small hole 155 located in the front end of the top member 152, suitably above the ledge or offset 154. This means that when a person holds the filler gun, the hinge connection 150, 151 will be adjacent the gun handle, and the snap engagement locking will be at the front region of the gun head. At least, no tampering can be made with the interconnection between the top member and the upper member when a person is filling a tank on a vehicle, and any further attempt must be made with a tool.

With reference to in particular FIG. 7 of the drawings, and also FIG. 26, and further with reference to FIGS. 13, 16, 19, 21, 22, 38 upper members are shown as having a peripheral outline of substantially oval form. Further, the top member has also a peripheral outline of substantially oval form.

The substantially oval form may, for example, resemble a front contour outline of a human head, the contour outline of a fruit, such as mango, apple and pineapple, or a vegetable such as aubergine or the contour outline of an animal egg.

Suitable dimensions of the top member in the longitudinal direction are in the range of 110–140 millimeters and a maximum transverse dimension in the range of 80–105 millimeters. Preferably, the longitudinal dimension is in the range of about 120–135 millimeters and the maximum transverse dimension in the range of about 90–100 millimeters.

As previously mentioned, the existence in any given market area of a plurality of differently sized and/or shaped filler guns creates a problem. More specifically, this ordinarily would require the printing and distribution of a plurality of filler gun message cards of different sizes and/or contours. This would adversely impact on the widespread use of filler gun advertising messages.

To obviate this, a feature of the present invention is to provide a “family” of carrying bodies, each carrying body of the family having side and bottom portions which are sized and shaped to conform substantially to the size and shape of the corresponding bottom and side exterior surfaces of a particular model of filler gun. However, the shape, size, and configuration of at least the upper portions of the carrying body, i.e. near the location of the top display surface, can permissibly be of substantially uniform shape and size for substantially all the different filler guns of a family of such guns.

More specifically, the top, message supporting surface of any carrying body is preferably sized and configured so as to be removably attachable to that carrying body's side and bottom portions, As a result, the top message supporting surface is then readily detachably secured to the aforesaid bottom and side portions of the carrying body. The top message supporting portion is provided with a supporting surface of a size and configuration which is adapted to removably support thereon the standardized shape and size of message card.

Figure 78:
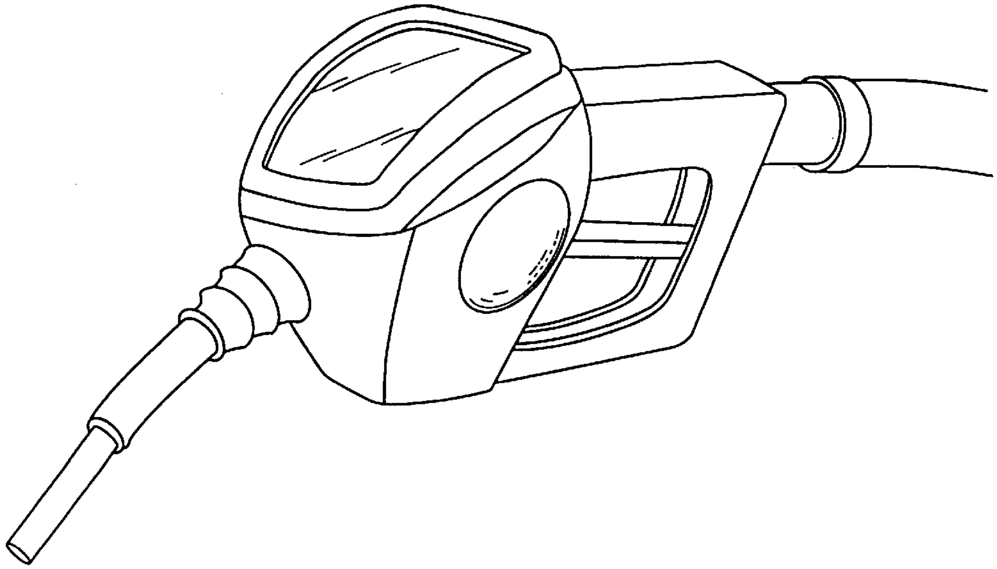
FIGS. 78 and 79 are front perspective views of display apparatus adapted to be used on filler guns having different configurations but with each providing for the display of respective advertising messages of a uniform size and configuration.
Figure 79:
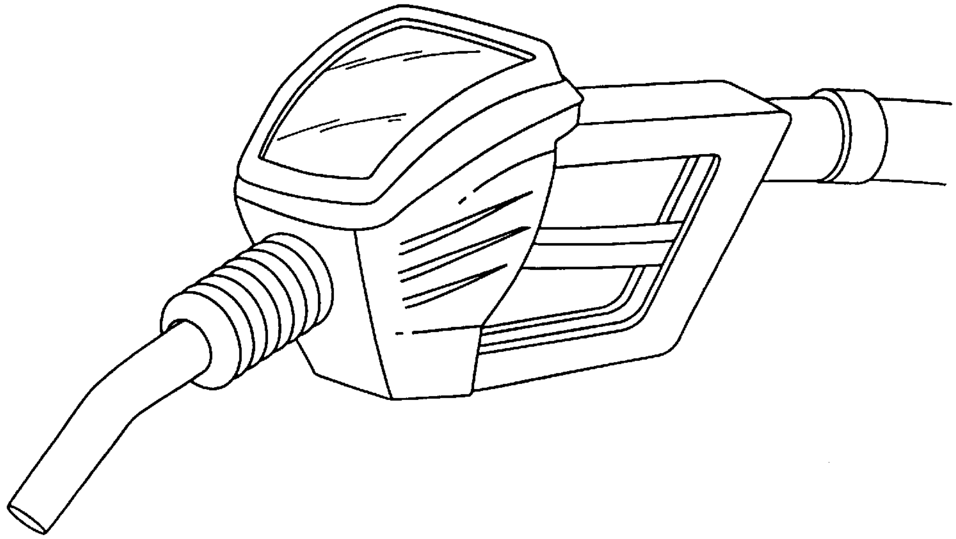

FIGS. 78 and 79 illustrate filler guns having different sizes and configurations. For example, the height of the gun handle portions are substantially different, with the height of the gun handle in FIG. 79 being in excess of the height of the gun head shown in FIG. 78. The nozzles of the gun heads are also shown as being different in diameter. Furthermore, the breadth of the filler gun head in FIG. 79 is, on the other hand, less than that of FIG. 78. Despite these differences in sizes and contours of the filler guns illustrated in FIGS. 78, and 79, it is clearly shown that the top display surface in both drawings is of the same size and configuration in both FIGS. 79 and 78 so that both can support on their upper display surfaces message cards all of the same size and configuration.

Although preferred embodiments of the present invention have been shown and described, it will be possible for a person skilled in the art to modify the present display apparatus, and the scope of the present invention is therefor only to be limited by the features of the attached patent claims and technical equivalents thereof. Although the invention has been specifically described and claimed with reference to the use on the filler gun of a fuel pump, it will be readily appreciated that the present invention could be used on other types of fluid filler guns, such as typically found at service stations for automobiles, and that such use would also lie within the meaning of technical equivalence.

What is claimed is:

1. A display apparatus for a fluid pump filler gun, the filler gun including in sequence a barrel, a head portion, and a handle, the display apparatus comprising:

a carrying body removably attachable to the filler gun, having an upper surface defining a display surface; and a frame attachable to said carrying body for supporting a replaceable display card on said display surface;

wherein said carrying body includes an upper member and a lower member releasably connected to one another; and wherein said upper member and lower member are releaseably connected to one another with snap lock portions, respectively.

2. A display apparatus for a fluid pump filler gun, the filler gun including in sequence a barrel, a head portion, and a handle, the display apparatus comprising:

a carrying body removably attachable to the filler gun, having an upper surface defining a display surface; and a frame attachable to said carrying body for supporting a replaceable display card on said display surface;

wherein said frame includes a top frame surface and a peripheral skirt portion depending therefrom; and wherein said skirt portion is engagable with an indented peripheral portion of said upper surface.

3. The display apparatus of claim 2, wherein said first snap lock portion is provided on said skirt portion and said second snap lock portion is provided on said indented peripheral portion.

4. A display apparatus for a fluid pump filler gun, the filler gun including in sequence a barrel, a head portion, and a handle, the display apparatus comprising:

a carrying body removably attachable to and configured such that when attached, it substantially surrounds the head portion of the filler gun, having an upper surface defining a display surface; and a frame attachable to said carrying body for supporting a replaceable display card on said display surface;

wherein said frame includes a first snap lock portion releaseably engagable with a second snap lock portion on said carrying body; and a form-fitting plastic boot fittable over the filler gun head, wherein said carrying body is dimensioned to attach over and around said form-fitting boot.

5. The display apparatus of claim 1, 2, or 4, wherein said frame is releasably attachable to said carrying body.

6. The display apparatus of claim 1, 2, or 5, wherein said frame is pivotally attachable to said carrying body.

7. The display apparatus of claim 1 wherein said lower member includes two side panels interconnected with one another.

8. The display apparatus of claim 1, 2, or 5, wherein said frame includes a transparent face for viewing said display card therethrough.

9. The display apparatus of claim 1, 2, or 5, wherein said frame includes an open face for viewing said display card therethrough.

10. The display apparatus of claim 1, 2, or 5, wherein said display surface has a curved configuration along its length.

11. The display apparatus of claim 1, 2, or 5, wherein said frame has a curved configuration along its length.

12. The display apparatus of claims 1, 2, or 5, wherein at least one of said carrying body and said frame is made of a substantially hard plastic material.

13. The display apparatus of claim 12, wherein said plastic material is polyamide.

14. The display apparatus of claim 1, or 2, wherein said frame includes a snap lock portion releasably engagable with a snap lock portion on said carrying body.

15. A display apparatus for a fluid pump filler gun including in sequence a barrel, a head portion, and a handle, the display apparatus comprising:

a carrying body removably attachable to and configured such that, when attached, it substantially surrounds the head portion of the filler gun, having an upper surface defining a display surface; and a frame attachable to said carrying body for supporting a replaceable display card on said display surface;

wherein said frame includes a first snap lock portion releaseably engagable with a second snap lock portion on said carrying body;

wherein said carrying body includes a first hinge portion and said frame includes a second hinge portion pivotally engaging said first hinge portion; and wherein said first hinge portion engages said second hinge portion with radial play in a longitudinal direction of said carrying body.

16. The display apparatus of claim 5, wherein said frame includes an aperture for insertion of a tool to manipulate said second snap lock portion.

* * * * *